United States Patent
Braun et al.

(10) Patent No.: US 11,738,266 B1
(45) Date of Patent: Aug. 29, 2023

(54) TEXT TO PERFORMANCE PIPELINE SYSTEM

(71) Applicant: Electronic Arts Inc., Redwood City, CA (US)

(72) Inventors: Eric Braun, Frederick, MD (US); Peter Sung, Fremont, CA (US); Clayton Vaught, Sammamish, WA (US); Cullen Waters, Saint Johns, FL (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 17/701,060

(22) Filed: Mar. 22, 2022

(51) Int. Cl.
| | |
|---|---|
| A63F 13/56 | (2014.01) |
| A63F 13/57 | (2014.01) |
| A63F 13/5258 | (2014.01) |
| A63F 13/60 | (2014.01) |
| G10L 13/027 | (2013.01) |
| G06V 40/16 | (2022.01) |
| G06V 40/20 | (2022.01) |

(52) U.S. Cl.
CPC .......... *A63F 13/56* (2014.09); *A63F 13/5258* (2014.09); *A63F 13/57* (2014.09); *A63F 13/60* (2014.09); *G06V 40/165* (2022.01); *G06V 40/23* (2022.01); *G10L 13/027* (2013.01); *A63F 2300/6607* (2013.01)

(58) Field of Classification Search
CPC ...... A63F 13/56; A63F 13/5258; A63F 13/57; A63F 13/60; A63F 2300/6607; G06V 40/165; G06V 40/23; G10L 13/027
See application file for complete search history.

(56) References Cited

U.S. PATENT DOCUMENTS

| | | | |
|---|---|---|---|
| 7,637,806 B2* | 12/2009 | Rhyne, IV | A63F 13/822 463/40 |
| 9,364,762 B2* | 6/2016 | Osuna | A63F 13/56 |
| 10,118,099 B2* | 11/2018 | Condrey | A63F 13/60 |
| 10,315,113 B2* | 6/2019 | Marr | A63F 13/60 |
| 10,668,381 B2* | 6/2020 | Condrey | A63F 13/795 |
| 10,926,179 B2* | 2/2021 | de Plater | A63F 13/67 |
| 11,123,638 B2* | 9/2021 | Kitazono | A63F 13/822 |
| 11,417,042 B2* | 8/2022 | Rico | G06T 13/40 |
| 11,524,237 B2* | 12/2022 | Marr | A63F 13/63 |
| 11,547,943 B2* | 1/2023 | Cao | A63F 13/85 |

(Continued)

*Primary Examiner* — David L Lewis
*Assistant Examiner* — Matthew D Hoel
(74) *Attorney, Agent, or Firm* — Gray Ice Higdon

(57) ABSTRACT

Methods, apparatus and systems are provided for generating an interactive non-player character (NPC) scene for a computer game environment of a video game. Changes are detected in relation to a script associated with the interactive NPC scene. For each NPC, a set of NPC data associated with the interactions said each NPC has within the script is generated corresponding to the changes. The generated set of NPC data is processed with an NPC rig associated with said each NPC to generate an NPC asset. A camera solver is applied to a region of the computer game environment associated with the script for determining locations of NPC assets and one or more cameras within said region in relation to said interactive NPC scene. Data representative of said each NPC asset and said determined NPC asset and camera locations for use by a game development engine for generating said interactive NPC scene.

20 Claims, 13 Drawing Sheets

(56) References Cited

U.S. PATENT DOCUMENTS

| | | | |
|---|---|---|---|
| 2008/0004093 A1* | 1/2008 | Van Luchene | G07F 17/32 463/1 |
| 2009/0253475 A1* | 10/2009 | Thompson | A63F 13/35 463/7 |
| 2011/0230258 A1* | 9/2011 | Van Luchene | A63F 13/77 463/43 |
| 2011/0230267 A1* | 9/2011 | Van Luchene | A63F 13/77 463/43 |
| 2014/0267230 A1* | 9/2014 | Osuna | A63F 13/58 345/419 |
| 2014/0342808 A1* | 11/2014 | Chowdhary | A63F 13/493 463/24 |
| 2016/0166935 A1* | 6/2016 | Condrey | A63F 13/48 463/31 |
| 2016/0279522 A1* | 9/2016 | de Plater | A63F 13/67 |
| 2016/0332081 A1* | 11/2016 | Marr | A63F 13/63 |
| 2017/0120150 A1* | 5/2017 | Berger | A63F 13/45 |
| 2017/0354885 A1* | 12/2017 | Kitazono | A63F 13/5372 |
| 2019/0291007 A1* | 9/2019 | Condrey | A63F 13/795 |
| 2020/0114264 A1* | 4/2020 | Marr | A63F 13/34 |
| 2020/0197811 A1* | 6/2020 | Eatedali | G06N 3/08 |
| 2021/0158589 A1* | 5/2021 | Rico | G06N 20/00 |
| 2021/0245057 A1* | 8/2021 | de Plater | A63F 13/67 |
| 2021/0268381 A1* | 9/2021 | Stere | A63F 13/56 |
| 2022/0193554 A1* | 6/2022 | Kim | A63F 13/67 |
| 2022/0241691 A1* | 8/2022 | Khan | A63F 13/5375 |
| 2022/0274023 A1* | 9/2022 | Vange | G06N 20/00 |
| 2022/0309364 A1* | 9/2022 | Perry | A63F 13/56 |

* cited by examiner

TEXT TO PERFORMANCE PIPELINE SYSTEM

TECHNICAL FIELD

The present application relates to apparatus, systems and method(s) for generating one or more interactive non-player character (NPC) scenes for a computer game environment of a video game and/or building the video game with interactive NPC scenes and the like using a text to performance pipeline system.

BACKGROUND

Video games may use cinematic interactive non-player character (NPC) scenes for immersing a player (or gamer) into the story arc of a video game during gameplay. This is particularly so for three dimensional (3D) computer game environments of 3D video games. Typically, such video games have a plurality of interactive NPC scenes that a player experiences as they move through the computer game environment and/or reach certain points in the story arc of the video game. One or more scripts may be used to describe the interactive NPC scenes along the story arc of the video game. A script may comprise or represent data describing the dialogue, actions, expressions and/or interactions that one or more NPCs of the video game may have in each scene. Each of the NPCs in an interactive NPC scene may be represented by an NPC asset containing data representative of voice, facial and body performances (e.g. animations) and the like. These may be used for generating realistic cinematic sequences for the interactive NPC scenes, each of which may be presented when the player reaches the corresponding point in the story arc of the video game.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides method(s), apparatus and system(s) for generating a plurality of interactive NPC scenes in a computer game environment of a video game and/or building said video game therefrom. One or more users may develop one or more of said interactive NPC scenes associated with one or more scripts of the video game. When changes are detected in response to each user generating and/or updating one or more scripts and/or associated digital NPC assets/NPC assets, the corresponding digital assets associated with the changes are automatically retrieved, generated and/or updated and the corresponding interactive NPC scenes of the video game are updated accordingly.

In a first aspect, the present disclosure provides a computer-implemented method of generating an interactive NPC scene for a computer game environment of a video game, the method comprising: detecting changes in relation to a script associated with the interactive NPC scene; generating, for each NPC, a set of NPC data associated with the interactions said each NPC has within the script corresponding to the changes; processing the generated set of NPC data with an NPC rig associated with said each NPC to generate an NPC asset; applying a camera solver to a region of the computer game environment associated with the script for determining locations of NPC assets and one or more cameras within said region in relation to said interactive NPC scene; and outputting data representative of said each NPC asset and said determined NPC asset and camera locations for use by a game development engine for generating said interactive NPC scene.

The method may further comprise receiving data representative of a script in relation to one or more NPC interactions within the computer game environment; and processing, for each NPC, the script to identify the interactions said each NPC has within the script for generating the set of NPC data.

The method may further comprise an asset management system configured for retrieving a digital asset corresponding to each identified interaction of said each NPC associated with the script based on: performing a search, in the asset management system, for one or more relevant digital assets corresponding to said each identified interaction of said each NPC associated with the script; in response to a positive search result, performing the steps of: selecting a digital asset from the one or more relevant digital assets based on the priority of said each relevant digital asset; and retrieving, from the asset management system, the selected digital asset for inclusion into the set of NPC data associated with said each NPC; in response to a negative search result, performing the steps of: sending a request to a backend provider associated with the type of digital asset corresponding to each identified interaction of said each NPC associated with the script, wherein the backend provider is configured to generate a digital asset corresponding to said each identified interaction of said each NPC associated with the script; retrieving said generated digital asset for inclusion into the set of NPC data. As an option, the received generated digital asset may be stored in the asset management system prior to and/or after the interactive NPC scene is generated. As an option, storage of the selected/generated digital assets in the asset management system may be performed after a user approves and/or finalises the selected/generated digital assets for use in the interactive NPC scene.

The method may further comprise generating a mapping linking each of the sets of NPC data and/or NPC assets with corresponding interactive portions of the script in relation to the interactive NPC scene for storing said mapping in the asset management system. The method may further comprise generating a mapping linking each of the generated interactive NPC scenes with the corresponding interactive portions of the script in relation to the interactive NPC scene for storing said mapping in the asset management system.

The method may further comprise where the set of NPC data associated with interactions of an NPC further comprising data representative of at least one of: a vocal digital NPC asset; a facial digital NPC asset; and a body digital NPC asset. As an option, the vocal digital NPC asset comprising one or more of: a voice recording of a person in relation to a portion of the script; and a synthetically generated voice in relation to a portion of the script; the facial digital NPC asset comprising one or more of: a facial motion capture recording of a person in relation to performing a portion of the script; and a synthetically generated facial animation in relation to a portion of the script; and the body digital NPC asset comprising one or more of: a body motion capture recording of a person in relation to performing a portion of the script; and a synthetically generated body animation in relation to a portion of the script.

The method may further comprise the camera solver configured for processing the region of the computer game environment associated with the script in relation to the interactions of said NPCs, said processing configured to determine a location for said each NPC asset within the region and an unobstructed camera framing for capturing the interactions of said each NPC asset within said region.

The method may further comprise generating the interactive NPC scene further comprising generating said interactive NPC scene of said each NPC interacting within said region based on positioning the corresponding NPC assets in the determined locations within said region and using one or more virtual cameras in relation to said determined unobstructed camera framing for capturing the interactions of the NPC assets.

The method may further comprise detecting changes in relation to a script associated with the interactive NPC scene further comprising detecting changes to one or more from the group of: the script associated with the interactive NPC scene; one or more lines of dialogue in the script associated with the interactive NPC scene; one or more additional lines of dialogue added to the script; one or more digital assets of the set of NPC data used for generating an NPC asset associated with the interactive NPC scene; one or more of the determined camera locations; and one or more other changes associated with the interactive NPC scene.

The method may further comprise detecting changes in relation to a script associated with the interactive NPC scene further comprising receiving changes from the game development engine corresponding to user edits associated with the interactive NPC scene.

The method may further comprise detecting changes in relation to a script associated with the interactive NPC scene further comprising receiving version change information associated with user edits of an NPC asset associated with the interactive NPC scene, the user edits comprising edits of one or more digital assets of the set of NPC data used for generating the NPC asset.

The method may further comprise the script comprises data representative of one or more from the group of: one or more lines of dialogue associated with the one or more NPCs in the interactive NPC scene; director's notes associated with the script; NPC rig associated with the one or more NPCs in the interactive scene; NPC model associated with the one or more NPCs in the interactive scene; the script associated with the interactive NPC scene; any other data associated with one or more NPC performances within the interactive NPC scene.

The method may further comprise iteratively performing generating an interactive NPC scene based on any changes and/or updates to at least one of: the interactive NPC scene; corresponding NPC assets associated with the interactive NPC scene; corresponding one or more digital assets of the set of NPC data for generating an NPC asset associated with the interactive NPC scene.

According to a second aspect of this specification, there is disclosed a pipeline system for generating an interactive NPC scene for a computer game environment of a video game, the pipeline system comprising one or more processors, a memory and a communication interface, the memory comprising instructions that, when executed by the one or more processors, cause the system to perform operations comprising: detecting changes in relation to a script associated with an interactive NPC scene; generating, for each NPC, a set of NPC data associated with the interactions said each NPC has within the script corresponding to the changes; processing the generated set of NPC data with an NPC rig associated with said each NPC to generate an NPC asset; applying a camera solver to a region of the computer game environment associated with the script for determining locations of the generated NPC assets and one or more cameras within said region in relation to said interactive NPC scene; and outputting data representative of said each generated NPC asset and said determined NPC asset and camera locations for use by a game development engine in generating the interactive NPC scene.

The pipeline system may further comprise the one or more processors are configured for outputting the data representative of said each generated NPC asset and said determined NPC asset and camera locations to a game building system configured for generating said interactive scene and building the video game with the said generated scene therein.

According to a third aspect of this specification, there is disclosed a client apparatus comprising a processor, a memory unit and a communication interface, wherein the processor is connected to the memory unit and the communication interface, wherein processor and memory are configured to implement the computer-implemented method according to the first aspect.

According to a fourth aspect of this specification, there is disclosed a system for building a video game with NPCs in a computer game environment, the system comprising one or more processors, a memory unit and a communication interface, the system further comprising: a plurality of client apparatus configured for generating a plurality of corresponding interactive NPC scenes for inclusion into the video game, each interactive NPC scene based on data representative of a script in relation to NPCs interactions within the computer game environment, each script is processed to identify, extract and store one or more digital assets as a set of NPC data associated with each NPC for generating NPC assets for a corresponding interactive NPC scene; a plurality of backend apparatus configured for generating digital assets associated with one or more interactions each NPC has within an interactive NPC scene of a script for inclusion into the set of NPC data for said each NPC; wherein the one or more processors of the system are configured to: detect changes in at least one of: one or more of the plurality of interactive NPC scenes; one or more scripts corresponding to said interactive NPC scenes; or one or more digital assets of the sets of NPC data used to generate NPC assets associated with said interactive NPC scenes; retrieve, for each detected change, one or more digital assets from storage or one or more of said plurality of backend apparatus for updating the corresponding set of NPC data; update NPC assets associated with the changes by applying the updated sets of NPC data to each corresponding NPC asset associated with said each NPC interactive scene; apply a camera solver to each region of the computer game environment associated with each script for determining locations of the corresponding updated NPC assets and one or more cameras within said region in relation to said interactive NPC scenes; and generate, using a game development engine, each of the plurality of interactive NPC scenes based on the corresponding region and determined locations of the corresponding NPC assets and the one or more cameras; and build the video game based on data representative of the plurality of NPC interactive scenes.

According to a fifth aspect of this specification, there is disclosed a method for building a video game with NPCs in a computer game environment, wherein a plurality of client apparatus configured for generating a plurality of corresponding interactive NPC scenes for inclusion into the video game, each interactive NPC scene based on data representative of a script in relation to NPCs interactions within the computer game environment, each script is processed to identify, extract and store one or more digital assets as a set of NPC data associated with each NPC for generating NPC assets for a corresponding interactive NPC scene; a plurality of backend apparatus configured for generating digital assets associated with one or more interactions each NPC has within an interactive NPC scene of a script for inclusion into the set of NPC data for said each NPC; wherein the method further comprising: detecting changes in at least one of: one or more of the plurality of interactive NPC scenes; one or more scripts corresponding to said interactive NPC scenes; or one or more digital assets of the sets of NPC data used to generate NPC assets associated with said interactive NPC scenes; retrieving, for each detected change, one or more digital assets from storage or said backend apparatus for updating the corresponding set of NPC data; updating NPC assets associated with the changes by applying the updated sets of NPC data to each corresponding NPC asset associated with said each NPC interactive scene; applying a camera solver to each region of the computer game environment associated with each script for determining locations of the corresponding updated NPC assets and one or more cameras within said region in relation to said interactive NPC scenes; and generating, using a game development engine, each of the plurality of interactive NPC scenes based on the corresponding region and determined locations of the corresponding NPC assets and one or more cameras; and building the video game based on data representative of the NPC interactive scenes.

According to an sixth aspect of this specification, there is disclosed a non-transitory tangible computer-readable medium comprising data or instruction code generating an interactive NPC scene for a computer game environment of a video game, which when executed on one or more processor(s), causes at least one of the one or more processor(s) to perform the steps of the method of: detecting changes in relation to a script associated with an interactive NPC scene; generating, for each NPC, a set of NPC data associated with the interactions said each NPC has within the script corresponding to the changes; processing the generated set of NPC data with an NPC rig associated with said each NPC to generate an NPC asset; applying a camera solver to a region of the computer game environment associated with the script for determining locations of NPC assets and one or more cameras within said region in relation to said interactive NPC scene; and outputting data representative of said each NPC assets and said determined NPC asset and camera locations for use in generating the interactive NPC scene.

According to a seventh aspect of this specification, there is disclosed a non-transitory tangible computer-readable medium comprising data or instruction code for building a video game with NPCs in a computer game environment of the video game, wherein a plurality of client apparatus are configured for generating the plurality of corresponding interactive NPC scenes for inclusion into the video game, each interactive NPC scene based on data representative of a script in relation to NPCs interactions within the computer game environment, each script is processed to identify, extract and store one or more digital assets as a set of NPC data associated with each NPC for generating NPC assets for a corresponding interactive NPC scene; a plurality of backend apparatus configured for generating digital assets associated with one or more interactions each NPC has within an interactive NPC scene of a script for inclusion into the set of NPC data for said each NPC, the code, which when executed on one or more processor(s), causes at least one of the one or more processor(s) to perform the steps of the method of: detecting changes in at least one of: one or more of the plurality of interactive NPC scenes; one or more scripts corresponding to said interactive NPC scenes; or one or more digital assets of the sets of NPC data used to generate NPC assets associated with said interactive NPC scenes; retrieving, for each detected change, one or more digital assets from storage or a backend apparatus for updating the corresponding set of NPC data; updating NPC assets associated with the changes by applying the updated sets of NPC data to each corresponding NPC asset associated with said each NPC interactive scene; applying a camera solver to each region of the computer game environment associated with each script for determining locations of the corresponding updated NPC assets and one or more cameras within said region in relation to said interactive NPC scenes; and generating, using a game development engine, each of the plurality of interactive NPC scenes based on the corresponding region and determined locations of the corresponding NPC assets and one or more cameras; and building the video game based on data representative of the NPC interactive scenes.

BRIEF DESCRIPTION OF THE DRAWINGS

Embodiments of the invention will be described, by way of example, with reference to the following drawings, in which.

Figure 1A:
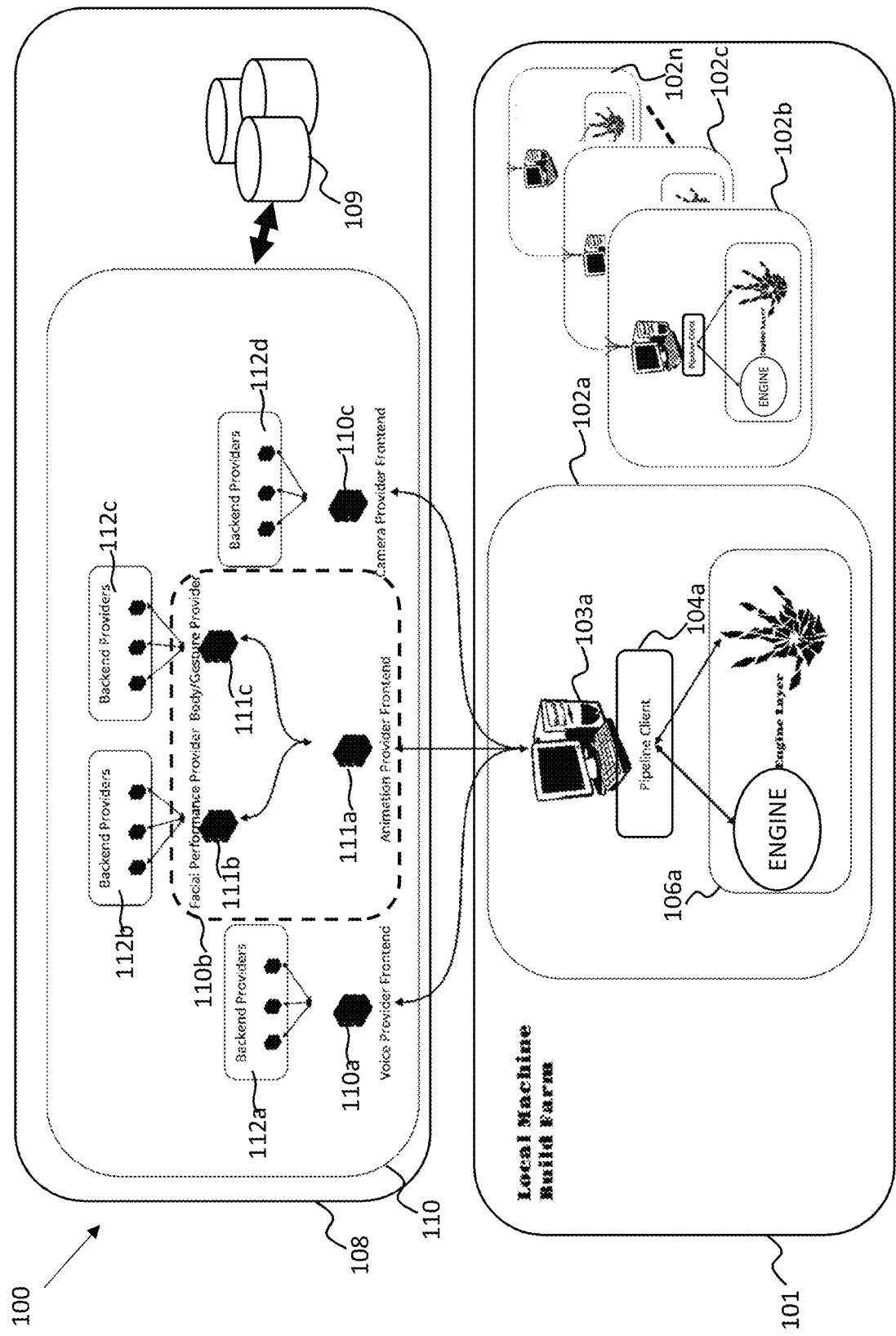
FIG. 1a illustrates an example game development pipeline system for generating a plurality of interactive NPC scenes in a computer game environment of a video game and/or building said video game according to some embodiments of the invention.

Common reference numerals are used throughout the figures to indicate similar features.

DETAILED DESCRIPTION

Figure is illustrates an example game development system 100 for generating a plurality of interactive non-player character (NPC) scenes in a computer game environment of a video game and/or building said video game therefrom. The game development system 100 includes a game development client system 101 (e.g. local machine build farm) communicatively coupled to a game management system 108. The computer game environment of the video game may be any type of computer game environment such as, without limitation, for example a two-dimensional and/or a three-dimensional game environment. The game development client system 101 includes a plurality of game development clients 102a-102n, each of which includes a game development pipeline client 104a and a game development engine 106a (e.g. Frostbite (RTM) engine, or other engine known to those of skill in the art), which may be used by one or more users for developing one or more of said interactive NPC scenes associated with one or more scripts of the video game. The game management system 108 is configured to include a game development pipeline system no (e.g. a text to performance pipeline system) coupled to a game asset management system (AMS) 109 (e.g. Perforce (RTM) development software/system and/or other digital asset management/control/versioning software/system known to those of skill in the art). The game development pipeline system no includes a plurality of NPC asset frontend providers 110a-110c configured to operate with each game development pipeline client 104a, the game AMS 109 and/or NPC asset backend providers 112a-112d to retrieve, generate/update, store, and/or access digital NPC assets and/or cinematography digital assets in response to each user generating and/or updating one or more scripts and/or associated digital NPC assets, via said each game development client iota, in relation to corresponding one or more interactive NPC scenes of the video game. Game AMS 109 may be configured to perform, without limitation, for example storage, source control, versioning and/or digital asset management of all the assets and/or digital assets associated with developing and building the video game such as, for example, digital NPC assets, NPC assets, interactive NPC scenes, scripts including NPC lines of dialogue and/or directors notes and portions thereof, versions/builds of the video game, virtual cameras and/or camera locations in the video game environment associated with interactive NPC scenes, cinematography digital assets associated with interactive NPC scenes, and/or other digital data and the like associated with the video game and/or as the application demands. For example, the game AMS 109 may be implemented to include a software control/versioning control system such as, without limitation, for example Perforce (RTM) or other AMS known to those of skill in the art.

Each video game may include a plurality of interactive NPC scenes over one or more timelines/story arcs within the video game, where each interactive NPC scene is associated with at least one script describing the interactions of NPCs with said each interactive NPC scene. Each script of an interactive NPC scene may include data representative of the interactive NPC scene for a particular time period within a timeline/story arc of the video game that includes one or more NPCs interacting within a region of the computer game environment of the video game. A script of an interactive NPC scene may comprise or represent data representative of the NPCs and/or interactions the NPCs have within the interactive NPC scene. Said each script may include, without limitation, for example data representative of one or more from the group of: one or more lines of dialogue associated with each NPC in the interactive NPC scene, for example, one or more lines of text indicating what each NPC says; director's notes associated with each NPC including, without limitation, for example data describing emotions and/or actions of said each NPC in the scene, and the like; data describing and/or referencing an NPC rig or model that is to be used for each NPC in the interactive NPC scene; and/or any other scene and/or video game data describing the aspects of the NPCs in the interactive NPC scene, each NPC in the scene, and/or the interactive NPC scene and the like.

For example, a script may include the lines of dialogue as a text-based document/data format that may be input by a user via a game design editor, game development client/engine and the like, where the script includes the lines of dialogue spoken by each NPC within the interactive NPC scene as text-based data. The script may also include data representative of directors notes indicating, without limitation, for example the one or more emotions, actions/gestures and/or reactions each NPC may make within and during each line of dialogue and/or within/during the interactive NPC scene. The directors notes may be entered into the script as text-based data and/or entered into the script or linked to the lines of dialogue in the script as digital data in another format that is representative of, without limitation, for example one or more emotions, emotional gestures, emotional actions, actions, gestures and/or reactions and/or any other performance/directional instructions/commands that can be used to direct the performance of each NPC during the interactive NPC scene. For example, one or more actions and/or gestures that an NPC may perform may include, without limitation, for example "pointing", "shrugging", "whooping", "jumping", "dancing", "walking", and/or any other action or gesture a "real" person may perform in relation to the one or more lines of dialogue in the script. One or more emotions or emotional actions/gestures that an NPC may perform in relation to the corresponding lines of dialogue in the script may include, without limitation, for example the NPC emoting "happiness", "sadness", "angriness", "sullen", "normal", "happily jumping", "angrily stamping", and/or "angrily punching fists" etc. and/or any other emotion or emotional gesture that a "real" person may perform in relation to the corresponding lines of dialogue in the script.

The directors notes may be selected from a list of pre-defined tags or commands defining various emotions, actions and/or gestures and the like that a user may enter into the script at appropriate locations/points in time to assist in directing/defining the NPC's performance. Directors notes may be entered into the script manually by a user. Alternatively or additionally, directors notes may be entered based on selection based data entry such as, without limitation, for example drop down menus and/or combo boxes, editable lists, editable combo boxes and/or any other graphical user interface widget for entering editable or non-editable lists of options/items and the like. For example, directors notes for each of the NPC's performance/lines of dialogue may be entered into the script by a user selecting from a drop down menu or combo box providing a list of director options associated with actions, emotions, gestures and/or any other data describing how the NPC should perform their lines of dialogue within the interactive NPC scene. The list of directors options may include, without limitation, for example data representative of voice performance options specific to one or more audio/voice backend providers, facial performance options specific to one or more facial backend providers, body performance options specific to one or more body backend providers. One or more of the listed director options may be selected and inserted at particular points of time/locations within the script and/or lines of dialogue to ensure the NPC performs the selected director option(s) (e.g. emotion/action and/or gesture and the like) at the right time/location in the script when performing their lines of dialogue.

In another example, a user of a game design editor/engine or game development client iota may be prompted to input directors notes into the script for each NPC and/or at particular point of time in the lines of dialogue performed by an NPC via selecting director options/items from one or more drop down menus comprising pre-defined lists director options including, without limitation, for example one or more NPC emotions, actions/gestures, reactions, performance instructions and the like for use in directing the NPC's performance that should be performed by the NPC at one or more locations/times within the lines of dialogue. A drop down menu with a list of predefined director NPC options or combo box with a list of director options enables a user to quickly select those NPC director options (e.g. emotions, actions/gestures, and/or reactions) that may be required for each NPC to perform their one or more lines of dialogue during the interactive NPC scene. For example, the drop down menu/combo box may be provided to the user at the beginning of the game development pipeline. Additionally or alternatively, a drop down menu/or combo box may be provided at one or more different stages of the game development pipeline based on when audio, vocal, facial and/or body/gesture performances for each NPC are created, generated and/or updated. The script may be updated based on the selected director options.

The director options (e.g. emotions, actions, gestures and the like) that may be provided to the user in drop down menus and/or combo boxes and the like may be based on the range of director options that is made available by the selected NPC asset backend providers from the NPC asset backend providers 112*a*-112*d* that are used to synthetically generate the one or more digital assets of the set of NPC data such as, one or more of audio/voice, facial and/or body NPC digital assets. For example, each NPC asset backend provider may only have a specific set of director options (e.g. voice performance options, emotion performance options, action performance) that it will accept. Thus, once the user selects the required NPC backend providers, then only those director options specific to each selected NPC asset backend provider may be made available as one or more dropdown menus or combo boxes of directors options for selection by the user when editing the script and/or lines of dialogue and the like. For example, a text-to-speech NPC asset backend provider may have, for example, specific voice performance options and emotion performance options that it will accept, these may be made available as a drop down menu of directors options for the user to select one of those voice/emotion options and the like. For example, a facial NPC asset backend provider may have, for example, specific facial performance options and/or emotion performance options that it will accept, these may be made available as a drop down menu of directors options for the user to select one of those facial/emotion options and the like. For example, a body NPC asset backend provider may have, for example, specific body performance options, action performance options and/or emotion performance options that it will accept, these may be made available as a drop down menu of directors options for the user to select one of those body/action/emotion options and the like.

The script may further include digital data representative of any other descriptors/data associated with each of the NPCs and their interactions within the computer game environment, for example, references to and/or type of NPC rig/model used by each NPC, location within the computer game environment that interactive NPC scene takes place, weather, time of day within the computer game environment, and any other aspects that may be required/useful for the interactive performance that each of the NPCs may have within the interactive NPC scene. These other descriptors may also be input or selected by a user when editing the script via one or more further drop down menus/combo boxes and the like with suitable lists of NPC descriptor items a user may select/choose from and the like.

For example, a user may use a game development interface of the game development engine 106*a* when creating or editing a script associated with an interactive NPC scene for the video game. Edits to the script may be updated in game AMS 109. The game development pipeline client 104*a* detects the new script and/or any edits/changes made in relation to the script, and generates or updates, for each NPC in the interactive NPC scene, a set of NPC data including one or more digital assets (e.g. audio/vocal NPC dialogue, facial NPC performances (e.g. animations), body NPC performances (e.g. animations) and the like) of the NPC in relation to the interactions said each NPC has within the script, changes to the script and the like. A set of NPC data may comprise or represent data representative of one or more digital assets of an NPC, a digital asset of an NPC comprising data representative of interactive NPC scene data associated with the NPC in relation to the script such as, without limitation, for example one or more digital NPC assets from the group of: audio/vocal digital NPC asset including data representative of audio/vocal speech of an NPC corresponding to an NPC's dialogue within the script; a corresponding facial digital NPC asset including data representative of corresponding facial NPC animations in relation to the interactions the NPC has in the script; a corresponding body digital NPC asset including data representative of corresponding body NPC animations in relation to the interactions the NPC has in the script and the like.

For example, the set of NPC data for an NPC in the interactive NPC scene may include at least one of: a vocal digital NPC asset; a facial digital NPC asset; a body digital NPC asset; associated with the NPC. The vocal digital NPC asset for an NPC may include data representative of one or more of: a voice recording of a person in relation to the NPC's dialogue portion of the script; and/or a synthetically generated voice in relation to the NPC's dialogue portion of the script. The facial digital NPC asset of an NPC may include data representative of one or more of: a facial motion capture recording of a person in relation to performing the NPC's dialogue portion of the script; and/or a synthetically generated facial animation in relation to the NPC's dialogue portion of the script and corresponding directors notes of the script. The body digital NPC asset of an NPC may include at least one or more of: a body motion capture recording of a person in relation to performing the NPC's dialogue portion of the script; and/or a synthetically generated body performance or animation in relation to the NPC's dialogue portion of the script and/or corresponding directors notes of the script. For example, a vocal digital NPC asset, a corresponding facial digital NPC asset, and/or a corresponding body digital NPC asset may be generated, edited and/or retrieved to form the set of NPC data for an NPC corresponding to one or more interactions of the NPC within the scene. Thus, the set of NPC data may include the vocal digital NPC asset, the corresponding facial digital NPC asset, and the corresponding body digital NPC asset that are associated with the NPC. Once generated, the set of NPC data (e.g. audio/vocal, facial and body performance or animation) may be applied to an NPC rig/model to generate an NPC asset, which may be used by a game development engine 106a to animate the NPC according to the script in an interactive NPC scene. For example, each of the NPCs in an interactive NPC scene can be represented by one or more NPC assets, where each NPC asset of an NPC may correspond to a portion of the interactive NPC scene in which that NPC interacts. Each NPC asset includes data representative of the voice, facial and body animations and the like that the NPC performs in the corresponding portion of the interactive NPC scene. The NPC assets may be used by game development engine 106a to animate the NPCs for generating realistic cinematic sequences for the interactive NPC scenes according to the script, each of which may be presented when the player reaches the corresponding point in the story arc of a video game.

The set of NPC data and/or NPC assets and changes to the script and the like may be stored/updated in the game AMS 109 (e.g. using Perforce (RTM)). This may be performed when the interactive NPC scene is displayed to the user via the game development client iota and the user approves the created/updated set of NPC data and/or NPC assets and the like. Should the user not approve or wish to edit amend the script to change the interactions of the NPCs, lines of dialogue, directors notes and the like, the user may make such amendments, in which another iteration of the game development pipeline system no is performed on the detected edits/changes to the script for updating the corresponding set of NPC data and/or NPC assets and the like. The game development pipeline client and system 104a and 110 are used in an iterative game development procedure that is performed as the user iteratively edits the sets of NPC data, NPC assets and/or script associated with the interactive NPC scene and reviews the resulting updated interactive NPC scene and so on. Alternatively or additionally, the created/updated sets of NPC data and/or NPC assets and changes to the script and the like may be automatically stored/updated in the game AMS 109 (e.g. using Perforce (RTM)) when created/updated, for example, as a back-up until the approved by the user.

For each change in the script and/or a new script, the game development pipeline client 104a may request the game development pipeline system no generate and/or retrieve data representative of a NPC asset corresponding to each NPC appearing in the script and/or generating/updating a NPC asset corresponding to each NPC based on any identified changes to the NPC's interactions, digital assets within the set of NPC data corresponding to the NPC as a result of the changes and/or new script. The game development pipeline system no may use a plurality of NPC provider frontends 110a-110c for querying and retrieving the required NPC data and/or digital assets from game AMS 109 and/or from one or more corresponding backend providers 112a-112d. The game development pipeline system 110 may be configured to process any retrieved/generated/updates of the set of NPC data corresponding to each NPC by applying these to an NPC rig or NPC model associated with said each NPC in the script to generate a corresponding NPC asset or update any corresponding NPC asset. The updated versions of the processed NPC assets and/or updated sets of NPC data may be stored in the game AMS 109 along with one or more links/mappings to the corresponding portions of the script in relation to the interactive NPC scene. The game development pipeline system no may include a cinematography NPC provider frontend 110c configured to apply a camera solver to a region of the computer game environment associated with the script for determining locations of the NPC assets corresponding to the NPCs in the scene, and for determining the locations of one or more virtual cameras within said region in relation to the interactive NPC scene.

The game development pipeline system no may output, in response to the requests from the game development pipeline client 104a, data representative of said each NPC asset and data representative of said determined NPC asset location, and determined virtual camera locations, which the game development pipeline client 104a sends to the game development engine 106a for generating said interactive NPC scene. The interactive NPC scene may be presented to a user of the game development client iota for further updates to the script and/or to each of the NPC assets and the like. The game development pipeline client 104a may detect any further changes/updates to the script and/or NPC assets and perform another iteration of updating the digital assets of the sets of NPC data and/or NPC assets associated with the changes and generating data representative of the updated interactive NPC scene. This process may be iterated while the user edits and/or updates one or more aspects of the script, NPC assets, digital assets within the set of NPC data corresponding to an NPC asset and the like of the interactive NPC scene. This may depend on the changes to the script and the like. Once a user is ready to finalise, approve or save the interactive NPC scene, the resulting interactive NPC scene, set of NPC data and/or NPC assets and the script and the like may be stored/updated by game development client iota in the game AMS 109 (e.g. using Perforce (RTM)).

Each NPC provider frontend 110a-110c may receive at least the changed portions of the script and use these to generate and/or update the corresponding digital assets in the sets of NPC data (e.g. NPC voice/audio, NPC facial/body animations, NPC camera and scene positioning etc.) of the NPC assets in relation to each NPC. The NPC provider frontends 110*a*-110*c* may include, without limitation, for example an NPC voice/audio provider frontend 110*a*, an NPC animation provider frontend 110*b*, and an NPC camera provider frontend 110*c*. The NPC animation provider frontend 110*b* may include an NPC animation frontend 111*a* including an NPC facial animation frontend provider 111*b* and an NPC body animation provider 111*c*, where the NPC animation frontend 111*a* applies the facial and body animation data from corresponding facial digital NPC asset and body digital NPC asset to an NPC rig/model for generating a corresponding NPC asset.

Each frontend provider 110*a*-110*c* may request whether the game AMS 109 storage includes one or more new or up-to-date digital assets of each set of NPC data (e.g. voice, facial and/or body motion capture) that correspond to the required changes and/or updates to the script and the like, which, if found may be used to generate/update the corresponding NPC asset. Otherwise, if not found in the game AMS 109, the corresponding frontend provider 110*a*-110*c* may request one or more backend providers 112*a*-112*d* in relation to generating or updating the corresponding digital assets of the set of NPC data, which may be stored in the game AMS 109 along with one or more links/mappings to the corresponding portions of the script in relation to the interactive NPC scene.

The game development client system 101 includes a plurality of game development clients 102*a*-102*n*, each game development client iota including a computer system/apparatus 103*a*, a game development pipeline 104*a* coupled to a game development engine 106*a*. As described in this example, a user of the game development client iota may use the computer system/apparatus 103*a* of game development client iota to interface and/or interact with the game development engine 106*a* to generate and/or edit a script for an interactive NPC scene of the video game using the game development engine 106*a* and/or update one or more digital assets of each set of NPC data of the one or more NPCs in a generated interactive NPC scene. Based on these user interactions, the game development engine 106*a* is configured to interact with the game development pipeline client 104*a*, which detects updates/changes to the script and NPCs within the interactive NPC scene and retrieves via the game development pipeline system no of the game management system 108 data representative of updated digital assets of the sets of NPC data associated with each of the NPCs in the interactive NPC scene in accordance with the detected changes/updates etc. The game development engine 106*a* may use the updated digital assets or retrieved digital assets to generate the interactive NPC scene according to the script, where the generated interactive NPC scene is displayed to the user via computer system/apparatus 103*a*. Thus, in a similar manner, the plurality of game development clients 102*a*-102*n* may each be configured for generating a plurality of corresponding interactive NPC scenes for inclusion into the video game. Each interactive NPC scene based on data representative of at least one of a plurality of scripts in relation to NPCs interaction within the computer game environment. Each script is processed to extract and store sets of NPC data for generating NPC assets for each of the corresponding interactive NPC scenes. The plurality of generated interactive NPC scenes may be used when building the video game. The interactive NPC scenes may also be stored by game AMS 109 along with one or more links or mappings that link each of the generated interactive NPC scenes with the corresponding interactive portions of the script.

Although the game development pipeline client 104*a* and game development engine 106*a* are described as being implemented on the computer apparatus 103*a*, this is for simplicity and by way of example only, it is to be appreciated by the skilled person that the game development pipeline client 104*a* and game development engine 106*a* may be implemented on one or more servers and/or a cloud computing platform and computer system/apparatus 103*a* may have a game development user interface to the game development engine 106*a* and/or game development pipeline client 104*a* and the like. Similarly, the game development pipeline system no may be implemented on one or more servers and/or a cloud computing platform.

Figure 1B:
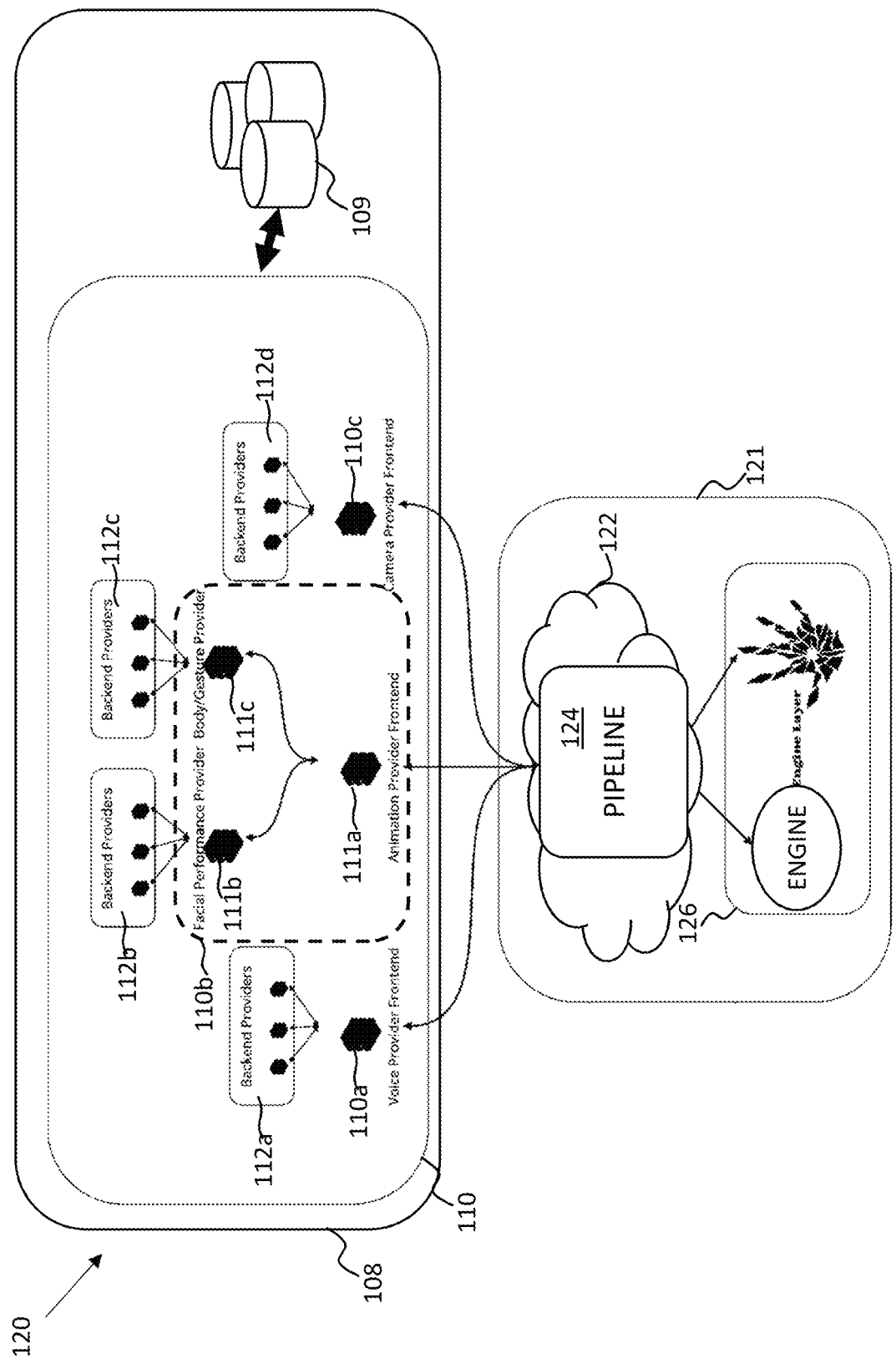
FIG. 1b illustrates another example game development pipeline system for detecting changes and updating a plurality of interactive NPC scenes generated using the game development system of FIG. 1a and/or building the video game with the updated interactive NPC scenes in the computer game environment of the video game according to some embodiments of the invention.

FIG. 1*b* illustrates another example game development pipeline system 120 for detecting changes since a previous build of a video game and updating a plurality of interactive NPC scenes generated using the game development system 100 of FIG. 1*a* and re-building the video game with the updated interactive NPC scenes in the computer game environment of the video game. In this example, a game development builder 124, which may be implemented on one or more servers and/or a cloud-based platform 122, may interact with the game management system 108 and game development pipeline system no and game AMS 109 to build an up-to-date version of the video game. In this example, a plurality of users using the plurality of game development clients 102*a*-102*n* have generated and/or updated a corresponding plurality of interactive NPC scenes as described with reference to FIG. 1*a*. For example, each user of a game development client 102*a* may generate and/or edit a script for an interactive NPC scene of the video game using the game development engine 106*a* and/or update one or more digital assets in each set of NPC data each corresponding the one or more NPCs in a generated interactive NPC scene. The updates/changes of the one or more sets of NPC data and/or digital assets therein and/or generated NPC scenes are saved and stored in the game AMS 109 in relation to the video game when a user finishes their game development session on the game development client 102*a*. Given that each user of the plurality of game development clients 102*a*-102*n* may be in different locations/locales and/or time zones, their corresponding interactive NPC scenes may be updated at different times during a working day and/or week. Thus, the aim of the game development builder 124 is to build a complete up-to-date version of the video game for at least one of a plurality of computing platforms (e.g. personal computer, consoles, different graphics cards, and the like), which should include all of the most up-to-date interactive NPC scenes using the latest versions of the corresponding sets of NPC data, scripts, NPC assets and/or cinematography data and the like. For example, a complete build may occur when all users have finished with their updates and/or at periodic times during the day, week and/or month.

The game development builder 124 may be configured to detect updates/changes to the scripts and/or digital assets of the sets of NPC data used within each interactive NPC scene and retrieves via the game development pipeline system no of the game management system 108 data representative of the updated digital assets associated with NPCs in each of the interactive NPC scenes in accordance with the detected changes/updates etc. The game development pipeline system no may be configured to retrieve the up-to-date digital assets in the sets of NPC data/NPC assets/NPC data and/or camera locations and the like for each of the interactive NPC scenes of the video game. This may also include the game development pipeline system no using the plurality of NPC provider frontend and/or corresponding backend apparatus

110*a*-110*c* and/or 112*a*-112*d* configured for generating digital assets associated with one or more of the sets of NPC data for said each NPC in said each interactive NPC scene. The game development pipeline system no may be configured to detect changes in at least one of: one or more of the plurality of interactive NPC scenes; one or more scripts corresponding to the interactive NPC scenes; or one or more digital assets in sets of NPC data corresponding to NPC assets associated with said interactive NPC scenes. The game development pipeline system no may be configured to retrieve, for each detected change, one or more digital assets from storage or said backend apparatus 112*a*-112*d*. The game development pipeline system no may be configured to update the NPC assets associated with the changes by applying the retrieved digital assets of the sets of NPC data to each corresponding NPC rig/model for forming the most up-to-date NPC assets associated with said each interactive NPC scene.

For each interactive NPC scene the game development pipeline system no may be configured to use, if any, the current up-to-date determined locations of NPC assets, virtual cameras for capturing the NPC interactions for each interactive NPC scene of the plurality of interactive NPC scenes. Alternatively and/or additionally, for example, should additional cinematography data be required for one or more of the interactive NPC scenes, the game development pipeline system no may use cinematography frontend 110*c* to use one or more corresponding backend providers 112*d* to apply a camera solver to each region of the computer game environment associated with each script for determining locations of the corresponding updated NPC assets and one or more cameras within said region in relation to said interactive NPC scenes. For each interactive NPC scene, the game development builder 124 may receive updated interactive NPC scene data representative of each generated NPC asset/sets of NPC data and said determined NPC asset and camera locations for use by a game development engine 126 in generating each of the interactive NPC scenes. The game development builder 124 may use the generated interactive NPC scenes from the game development engine 126 to generate and build the video game for the plurality of computing platforms.

Figure 1C:
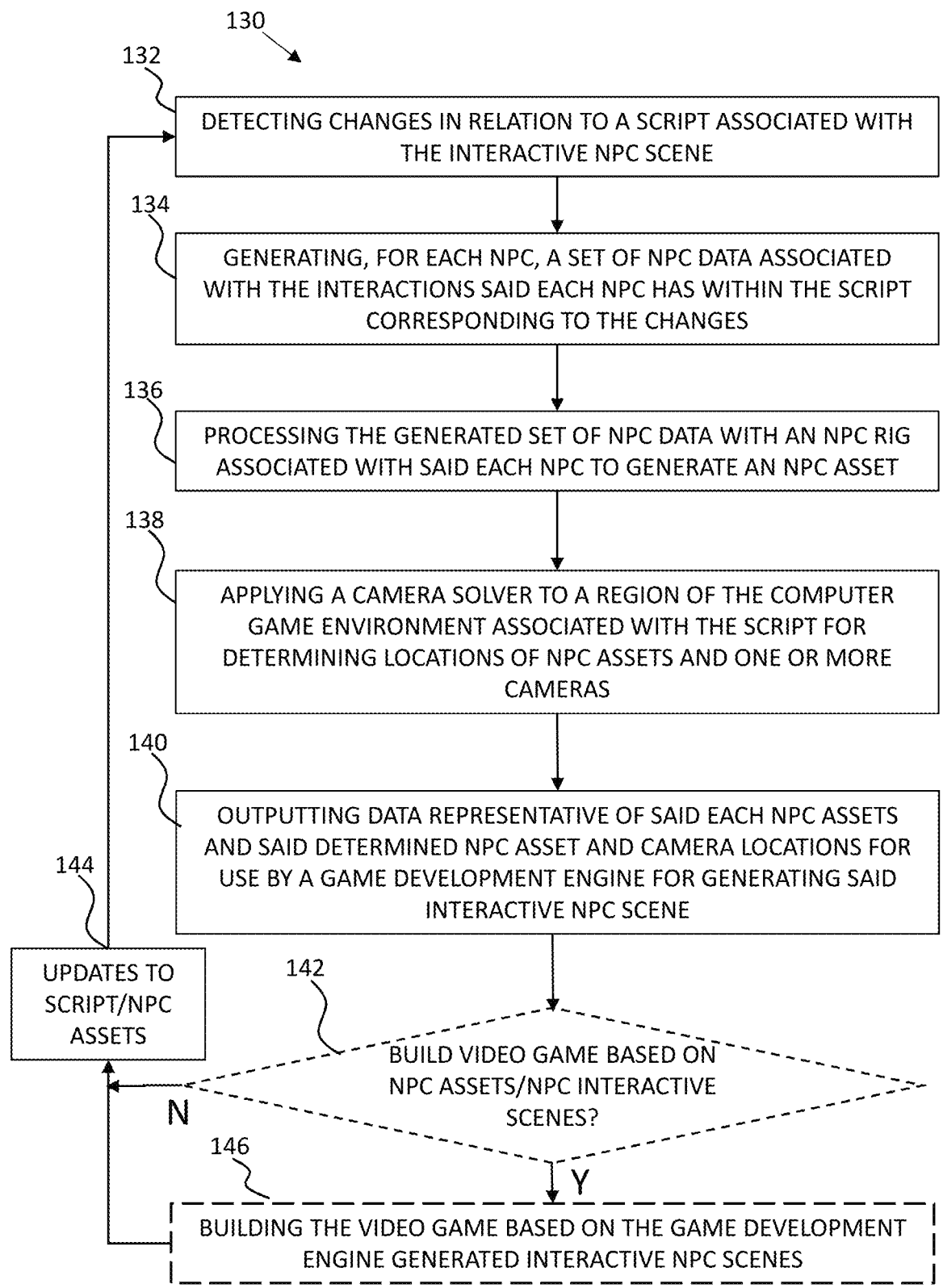
FIG. 1c illustrates an example game development pipeline process for iteratively generating interactive NPC scenes and/or building a video game from one or more of said generated interactive NPC scenes for use with game development systems of FIGS. 1a and 1b according to some embodiments of the invention.

FIG. 1*c* illustrates an example game development pipeline process 130 for generating one or more interactive NPC scenes and/or building a video game from one or more of said generated interactive NPC scenes for use with game development systems 100 and 120 as described with reference to FIGS. 1*a* and 1*b*. The game development pipeline client 104*a* and/or game development builder 124 may be used to detect changes in the scripts and/or corresponding set of NPC data/digital assets associated with the video game. Alternatively or additionally, this functionality may be merged with the game development pipeline system no, which is used to retrieve the required NPC assets for use by the game development engine 106*a* or 126 in building the corresponding interactive NPC scene and/or the video game and the like. The game development pipeline process client 104*a* and/or game development pipeline system no may be modified and/or configured to implement the game development pipeline process 130. For each interactive NPC scene, the game development pipeline process 130 for generating said each interactive NPC scene for the computer game environment of the video game may include the following steps of:

In step 132, detecting changes in relation to a script associated with the interactive NPC scene. As an option, detecting changes in relation to the script associated with the interactive NPC scene may further include, without limitation, for example detecting changes to one or more from the group of: the script associated with the interactive NPC scene; one or more lines of dialogue in the script associated with the interactive NPC scene; one or more directors notes associated with one or more lines of dialogue in the script; one or more additional lines of dialogue added to the script; one or more digital assets of a set of NPC data of an NPC asset associated with the interactive NPC scene; one or more of the determined camera locations; and one or more other changes associated with the interactive NPC scene. Alternatively one or more other changes associated with the script; and/or additionally, detecting changes in relation to a script associated with the interactive NPC scene may further include receiving changes from one or more game development engines corresponding to user edits associated with the interactive NPC scene. For example, a user may use a game development interface of a game development engine when editing a version of the interactive NPC scene. The user may edit one or more portions of the script (e.g. one or more lines of dialogue, one or more directors notes in relation to one or more lines of dialogue), one or more digital assets of a set of NPC data for one or more NPC assets of NPCs associated with the interactive NPC scene, and any other editable aspect associated with the interactive NPC scene and the like. Alternatively and/or additionally, detecting changes in relation to a script associated with the interactive NPC scene further includes receiving version change information associated with user edits of an NPC asset associated with the interactive NPC scene, the user edits including edits of one or more digital assets from the set of NPC data of the NPC asset.

In step 134, generating, for each NPC, a set of NPC data associated with the interactions said each NPC has within the script corresponding to the detected changes.

In step 136, processing the generated set of NPC data with an NPC rig associated with said each NPC to generate an NPC asset. For example, the NPC rig/model may be selected by a user, which may be stored in the script. The set of NPC data may then be applied to the NPC rig/model to generate the NPC asset. The NPC asset may then be used to generate the performance of the NPC in the interactive NPC scene.

In step 138, applying a camera solver to a region of the computer game environment associated with the script for determining locations of NPC assets and one or more cameras within said region in relation to said interactive NPC scene.

In step 140, outputting data representative of said each NPC assets and said determined NPC asset and camera locations for use by a game development engine 106*a* or 126 for generating said interactive NPC scene.

In step 142, as an option, determining whether to build a video game based on the NPC assets/interactive NPC scene. If a video game is not being built (e.g. 'N'), then proceed to step 144. Otherwise, if a video game is being built (e.g. 'Y'), then proceed to step 146.

In step 144, a check may be performed to determine whether any further updates to the script for the interactive NPC scene and/or changes to NPC assets and/or corresponding sets of NPC data associated with NPC assets within the interactive NPC scene are made. If this is the case, then proceed to step 132 for iteratively generating or re-generating the interactive NPC scene based on any further detected changes. Otherwise, simply wait until further changes/updates are made in relation to the interactive NPC scene and/or wait for a user to finalise, approve and or save the version of the interactive NPC scene along with the set of NPC data and NPC assets and other data used to generate the interactive NPC scene in the game AMS 109.

In step 146, as an option, when a video game is being built, the game development engine 106a or 126 may be configured to build the video game based on all of the most up-to-date generated interactive NPC scenes.

The process 130 may be an iterative process that iteratively performs generating of one or more of the interactive NPC scenes based on any detected changes and/or updates to at least one of: a script associated with the interactive NPC scene; each of the one or more interactive NPC scenes of the video game; corresponding NPC assets associated with each of the one or more interactive NPC scenes; corresponding one or more digital assets of NPC data of the set of NPC data of an NPC asset associated with each of the one or more interactive NPC scenes.

Figure 1D:
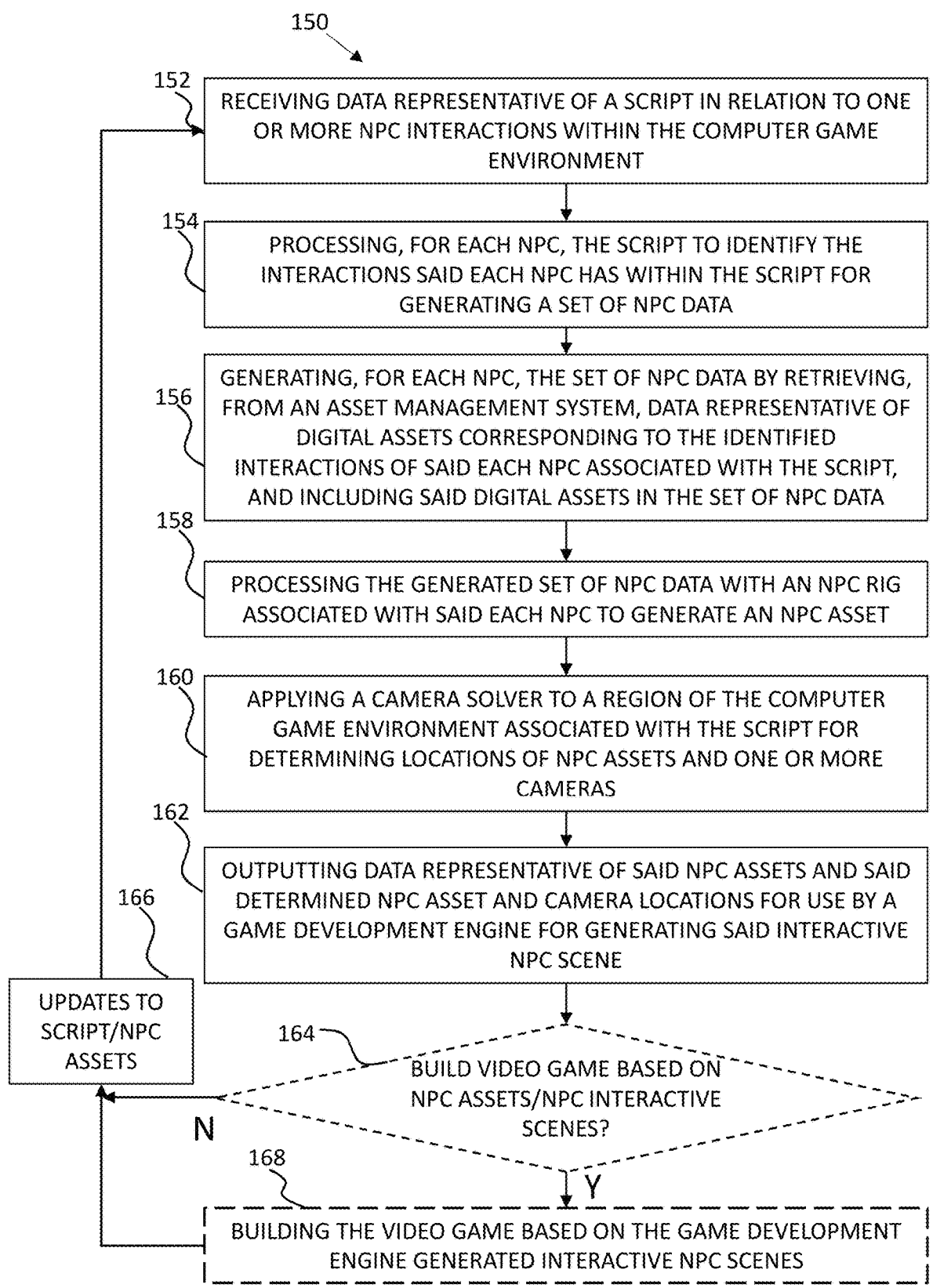
FIG. 1d illustrates another example game development pipeline process for iteratively generating interactive NPC scenes and/or building a video game from one or more of said generated interactive NPC scenes for use with game development systems of FIGS. 1a and 1b according to some embodiments of the invention.

FIG. 1d illustrates another example game development pipeline process 150 for generating interactive NPC scenes and/or building a video game from one or more of said generated interactive NPC scenes for use with game development systems 100 and 120 of FIGS. 1a and 1b. The game development pipeline client 104a and/or game development builder 124 may be used to detect changes in the scripts and/or corresponding digital assets of sets of NPC data/NPC assets associated with the video game. Alternatively or additionally, this functionality may be merged with the game development pipeline system 110, which is used to retrieve the required NPC assets for use by the game development engine 106a or 126 in building the corresponding interactive NPC scene and/or the video game and the like. The game development pipeline process client 104a and/or game development pipeline system no may be modified and/or configured to implement the game development pipeline process 150. For each interactive NPC scene, the game development pipeline process 150 for generating said each interactive NPC scene for the computer game environment of the video game may include the following steps of:

In step 152, detecting changes in relation to a script associated with the interactive NPC scene based on receiving data representative of the script in relation to one or more NPC interactions within the computer game environment. If the received script is a newly created script, then the detected changes constitute the entire received script.

In step 154, processing, for each NPC, the detected changes of the received script to identify the interactions said each NPC has within the script in relation to the detected changes for generating a set of NPC data for said each NPC interaction.

In step 156, generating, for each NPC, the set of NPC data by retrieving, from a game AMS 109 and/or one or more corresponding backend apparatus 112a-112d, data representative of one or more digital assets corresponding to the identified interactions of said each NPC associated with the script, where the retrieved digital assets may form or be stored as a set of NPC data associated with said each NPC.

In step 158, processing the generated set of NPC data associated with said each NPC with an NPC rig or model associated with said each NPC to generate an NPC asset associated with the NPC. The NPC rig/model may be selected by the user creating or editing the script and/or the interactive NPC scene, where the set of NPC data associated with each NPC is applied to the NPC rig/model to generate the corresponding NPC asset. The NPC asset comprises data required by a game development engine 106a to generate the performance of the NPC in the interactive NPC scene. Additionally and/or alternatively, a mapping may be generated that links each of the set of NPC data or digital assets therein and/or NPC assets with corresponding portions of the script in relation to the NPC scene along with versioning information and the like, for use in storing said mapping and versioning data in the game AMS 109. This may be used to determine the most up-to-date set of NPC data and/or NPC assets when building a video game and/or generating the interactive NPC scene.

In step 160, applying a camera solver to a region of the computer game environment associated with the script for determining locations of NPC assets and one or more cameras within said region in relation to said interactive NPC scene.

In step 162, outputting data representative of said each NPC assets and said determined NPC asset and camera locations for use by a game development engine 106a or 126 for generating said interactive NPC scene. When a user is editing/creating an iteration of the interactive NPC scene using game development client 102a, the game development engine 106a may receive and process the output data representative of said each NPC assets and said determined NPC asset and camera locations for generating and displaying said interactive NPC scene to the user of the game development client 102a. The game development client 102a may be configured to store each of said generated set of NPC data and/or NPC assets in the game AMS 109 when instructed to do so by the user, e.g. the user approves or finalises the interactive NPC scene when displayed, and/or saves the version of the interactive NPC scene for future update and/or retrieval.

In step 164, as an option, determining whether to build a video game based on the NPC assets/interactive NPC scene. If a video game is not being built (e.g. 'N'), then proceed to step 166. Otherwise, if a video game is being built (e.g. 'Y'), then proceed to step 168.

In step 166, a check may be performed to determine whether any further updates to the script for the interactive NPC scene and/or changes to NPC assets and/or corresponding digital assets of a set of NPC data associated with NPC assets within the interactive NPC scene are made. If this is the case, then proceed to step 162 for iteratively generating or re-generating the interactive NPC scene based on the detected changes. Otherwise, simply wait until further changes/updates are made in relation to the interactive NPC scene.

In step 168, as an option, when a video game is being built, the game development engine 106a or 126 may be configured to build the video game based on all of the most up-to-date generated interactive NPC scenes.

The process 150 may be an iterative process that iteratively performs generating of one or more of the interactive NPC scenes based on any detected changes and/or updates to at least one of: one or more portions of the script (e.g. one or more lines of dialogue and/or one or more directors notes in relation to one or more lines of dialogue); each of the one or more interactive NPC scenes of the video game; corresponding NPC assets associated with each of the one or more interactive NPC scenes; corresponding one or more digital assets or other NPC data of the set of NPC data of an NPC asset associated with each of the one or more interactive NPC scenes.

In the processes 130 and iso, steps 138 and/or 160 may be further modified in which the camera solver may use machine learning algorithms (e.g. a camera solving model) and/or heuristic algorithms (e.g. rule based camera solving models) for determining NPC locations and/or virtual camera locations depending on the computer game environment. The camera solver may also be further configured for processing the region of the computer game environment associated with the script in relation to the interactions of said NPCs. The processing may be configured to determine a location for said each NPC asset within the region and an unobstructed camera framing for capturing the interactions of said each NPC asset within said region. The unobstructed camera framing may be determined based on the ML camera model and/or a combination of the ML camera model and heuristic camera model. For example, if the ML camera model places a virtual camera that does not have an unobstructed view (e.g. within a wall of a building in the computer game environment) and/or has an unobstructed view from a poor location (e.g. too close or too far away from the NPCs interacting), then the heuristic camera model may be applied to generate a suitable unobstructed camera framing for capturing the interactions of the NPC assets.

Figure 1E:
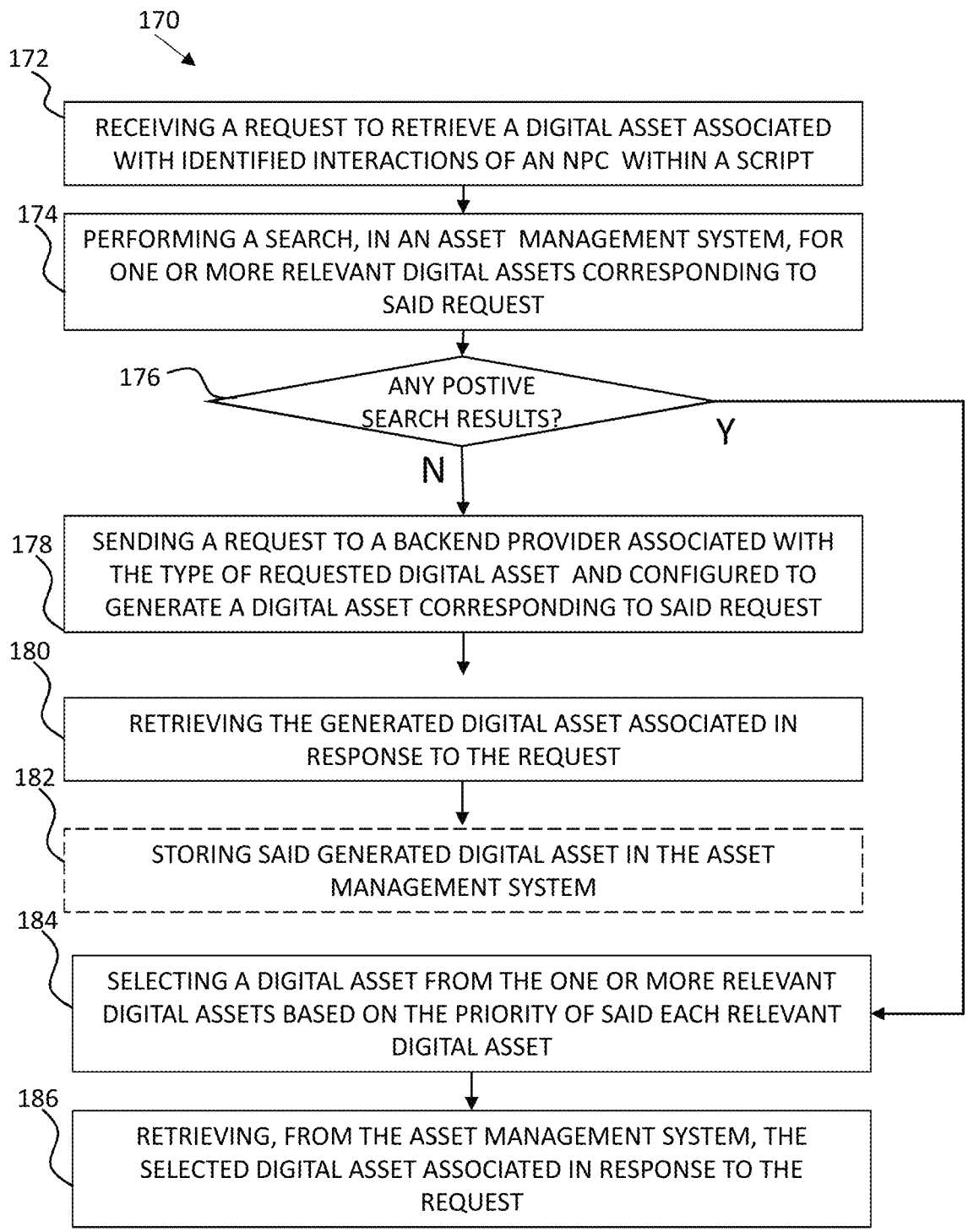
FIG. 1e illustrates an example NPC retrieval process for retrieving and/or generating NPC data and/or assets when requested by game development pipeline processes of FIG. 1c or 1d according to some embodiments of the invention.

FIG. 1e illustrates an example NPC retrieval process 170 for retrieving and/or generating a set of NPC data, one or more digital assets therein, and/or NPC assets when requested by game development pipeline processes 130 and/or 150 of FIG. 1c or 1d. The steps 134 or 156 by game development pipeline processes 130 and/or 150 for generating a set of NPC data and/or NPC assets associated with a script may be further modified to include an NPC retrieval process 170 that is configured to either retrieve already stored digital assets of the set of NPC data and/or NPC assets and/or generate digital assets for the set of NPC data and/or NPC assets. The NPC retrieval process 170 may make use of the NPC provider frontend apparatus 110a-110c where the game AMS 109 may be used for searching and/or retrieving the requested sets of NPC data/digital assets and/or the one or more corresponding NPC backend apparatus 112a-112d for generating the requested set of NPC data/digital assets and the like. The NPC retrieval process 170 may include the following steps of:

In step 172, receiving a request to retrieve one or more digital assets associated with identified interactions of an NPC corresponding to a script in relation to an interactive NPC scene. For example, the script may have been processed as described with reference to FIGS. 1a to 1d to identify the interactions of each NPC in an interactive NPC scene, where the identified interactions may include at least one or more of vocal, facial and/or body interactions of the NPC. In order to generate a set of NPC data for use in generating an NPC asset for the NPC in the interactive scene, one or more digital assets may be requested in relation to the identified NPC interactions such as, for example, a vocal digital NPC asset, a facial digital NPC asset and/or a body/gesture digital NPC asset corresponding to the interactions of the NPC in the interactive scene. These may then be added to or used to update the corresponding set of NPC data.

In step 174, performing a search, in the game AMS 109, for one or more relevant digital assets corresponding to said request and the identified interactions therein in relation to each set of NPC data and/or NPC asset.

In step 176, checking whether the game AMS 109 issues a positive search result in relation to the request. For example, a search result is positive when one or more relevant digital assets have been found in relation to one or more of the identified interactions of the request. A search result is negative when no relevant digital assets have been found in relation to one or more of the identified interactions of the request. If any positive search results (e.g. 'Y') in relation to the request exists, then proceed to step 184. If any negative search results in relation to the request exists, then proceed to step 178. The search result may be a partial search result i.e. a search result that is both positive and negative, in which some of the identified interactions have had relevant digital assets are found for them, i.e. a positive search result, but where other identified interactions of the request have no relevant digital assets found for them, i.e. a negative search result. In this case, both steps 184 and 178 may be proceeded with, which may be concurrently or serially until all of the identified interactions have relevant digital assets retrieved/generated for them. That is, for the positive search results the NPC retrieval process 170 proceeds to step 184, and for the negative search results the NPC retrieval process 170 proceeds to step 178. For example, the block of steps 184-186 and the block of steps 178-182 may be performed concurrently, asynchronously, or serially as the application demands.

In step 178, sending a request to one of the corresponding NPC backend providers 112a-112d associated with the type of requested digital asset, where said corresponding NPC backend provider 112a-112d is configured to generate a digital asset corresponding to said identified interactions of said request in relation to the negative results associated with the script. For example, one of the NPC backend providers 112a-112d may be selected for generating a digital asset. The selected NPC backend provider may be configured to generate a voice digital asset, facial and/or body digital asset based on the one or more lines of dialogue of the script and corresponding directors notes associated with the one or more lines of dialogue of the script. The directors notes (e.g. emotions, voice, actions etc.) may be provided as a drop down menu or combo box that includes a list of the specific directors options that the NPC backend provider 112a only provides when generating the corresponding digital asset. The user may select the appropriate director options to enable the NPC backend provider to generate the digital asset in accordance with the interactive NPC scene.

In step 180, retrieving, in response to the request, from the one or more backend providers 112a-112d said one or more generated digital assets associated with the identified interactions of the negative results. The generated digital assets are used to update/generate the set of NPC data. This may also include sending the digital assets as the set of NPC data to the corresponding NPC provider frontends 110a-110c for generating and/or updating the corresponding NPC assets and the like.

The retrieved generated digital assets may be passed through the game development pipeline 106a to the game development engine 104a for displaying the updated interactive NPC scene based on the generated/retrieved digital assets to the user via computer apparatus/system 103a of game development client iota. The user of the game development client iota may further edit/review each generated/retrieved digital asset and/or the script in which the game development pipeline 106a performs further iterations/updates to the generated digital assets and/or interactive NPC scenes and the like. Thus, the generated digital assets and/or interactive NPC scene may be iteratively developed/updated. As an option, in step 182, once approved by the user, the final resulting generated digital assets may be stored in the game AMS 109. This may occur prior to and/or after the interactive NPC scene has been created/generated and/or updated. Alternatively or additionally, as another option, step 182 may be further modified to automatically store the one or more generated digital assets in the game AMS 109, at least for back-up purposes, and/or may be automatically stored in temporary storage until the user has approved the generated digital assets. In order to minimise the number of storage requests to the game AMS 109, as a further option, step 182 may be further modified to request approval from a user of the game development client 102a prior to storing each generated digital asset via the game development client 102a in game AMS 109.

In step 184, selecting, from each positive search result for each identified interaction in the request, a digital asset from the one or more relevant digital assets based on the priority of said each relevant digital asset in relation to said identified interaction. For example, the priority of a digital asset may be based on whether the digital asset is synthetically generated and/or generated using a person in relation to the script. For example, a vocal/audio digital NPC asset may be generated from audio capture of a person performing an NPC's dialogue, or a facial and/or body digital NPC asset may be generated from motion capture of a person performing facial and/or body actions in relation to an NPC's dialogue. A vocal/audio digital NPC asset may be synthetically generated using machine learning and/or other text-to-speech systems that use the NPC's dialogue in a script and/or directors notes in the script and the like to synthetically generate the vocal/audio digital NPC asset of the NPC in relation to the script. A facial and/or body digital NPC asset may be synthetically generated using machine learning and/or other facial and/or body animation systems that use the NPC's vocal/audio digital NPC asset, dialogue from the script and/or directors notes from the script and the like to synthetically generate the facial and/or body performance (e.g. animation) digital NPC asset of the NPC in relation to the script. Synthetically generated NPC digital assets may have a lower priority than a studio NPC digital asset generated based on a person's real world performance. However, this may depend on the user's preferences and/or requirements of the video game. This may be specified by the user in the script and/or prior to each iteration of the game development pipeline client 104a/system no.

In step 186, retrieving, from the game AMS 109 the selected digital assets associated with said each set of NPC data and/or NPC asset. The retrieved digital assets may be used to update or form each set of NPC data, which may be sent to the corresponding NPC provider frontends 110a-110c for generating and/or updating the corresponding NPC assets and the like.

The retrieved selected digital assets may be passed through the game development pipeline client 104a/system no to the game development engine 106a for generating the interactive NPC scene and displaying the updated interactive NPC scene based on the generated/retrieved digital assets to the user via computer apparatus/system 103a of game development client 102a. The user of the game development client 102a may further edit/review each selected/retrieved digital asset and/or the script in which the game development pipeline client 104a and/or system 110 performs further iterations/updates to the selected digital assets and/or interactive NPC scenes and the like. Thus, the selected digital assets and/or interactive NPC scene may be iteratively developed/updated. As an option, in step 186 may be further modified to, once approved by the user, update, save and/or store the current versions of the selected digital assets and interactive NPC scene in the game AMS 109. This may occur after each iteration or several iterations of the game development pipeline 106a prior to and/or after the interactive NPC scene has been created/generated and/or updated.

Figure 2:
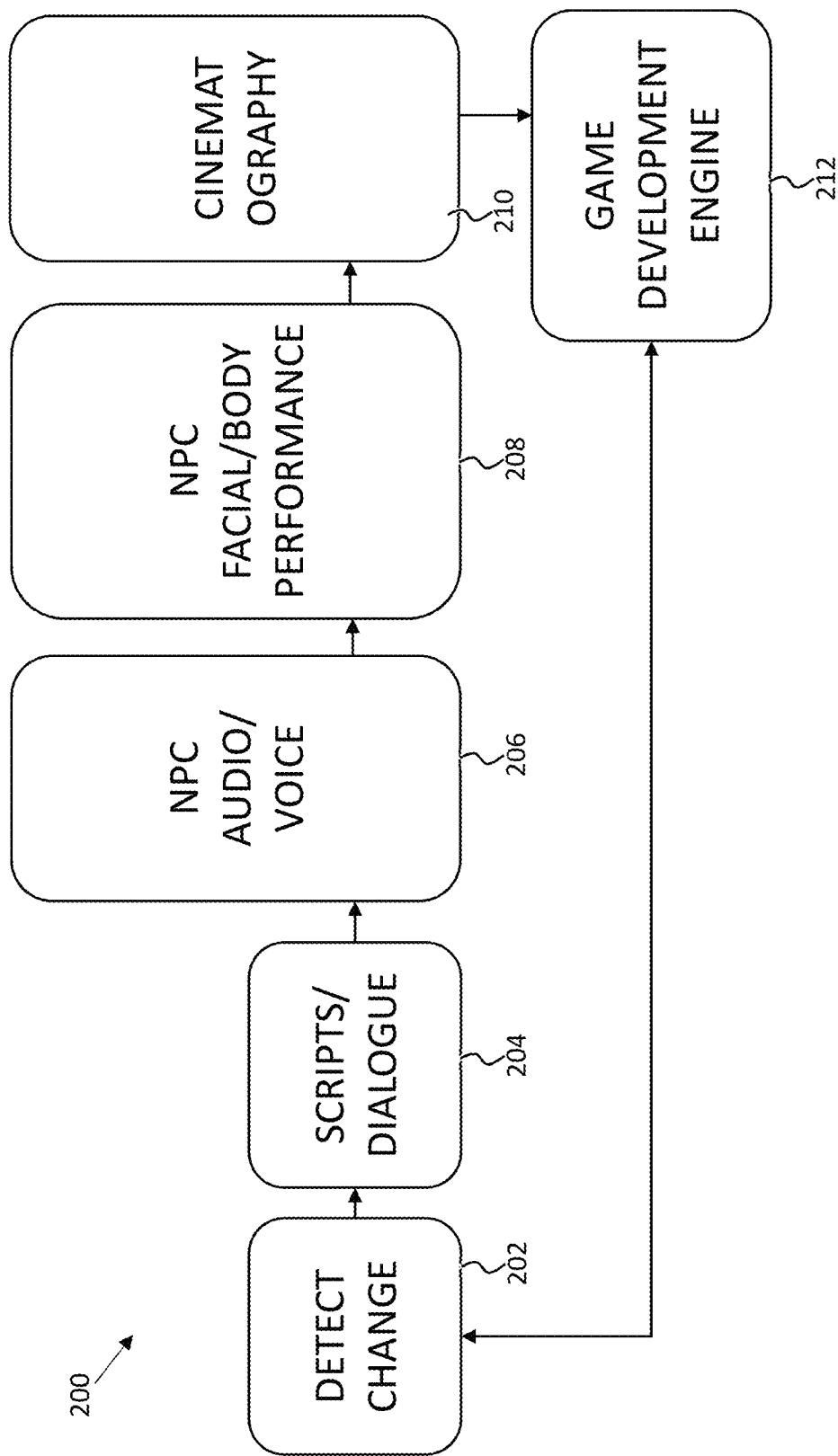
FIG. 2 illustrates another example game development pipeline system for generating/updating interactive NPC scenes and/or building a video game including said interactive NPC scenes according to some embodiments of the invention.

FIG. 2 illustrates another example game development pipeline system 200 for generating/updating NPC assets and/or corresponding interactive NPC scenes and/or building a video game including said NPC assets and/or corresponding interactive NPC scenes. The game development pipeline systems 110 and/or 106a and corresponding processes 130, 150 and/or 170 may be further modified based on the game development pipeline system 200. The game development pipeline system 200 includes a detect change component 202, a scripts/dialogue processing component 204, an NPC audio/voice component 206, an NPC facial and/or body performance component 208, a cinematography component 210, which is coupled to a game development engine 212 (e.g. game development engine 106a or 126 and the like). The game development engine 212 may be coupled to a game development client 102a, in which the game development engine 212 may display the interactive NPC scene, once generated, to a user editing the script and/or digital assets associated with the interactive NPC scene and the like. The components of game development pipeline system 200 may also be coupled to, access or query a digital asset management system such as, for example, game AMS 109 of game development system 108 (e.g. Perforce (RTM)). The game development engine 212 is also configured to feed into the detect change component 202.

The game development pipeline system 200 and/or game development engine 212 may communicate with and/or is a part of a game development client iota of a user for display of the interactive NPC scenes and/or NPC assets associated thereto that are generated/updated by the game development pipeline system 200. The game development client iota using the game development engine 212 may be configured to enable the user to change, edit, update, and/or finalise (e.g. "pin") the corresponding NPC assets, script data, and/or other data associated with the displayed interactive NPC scene that is output by the game development pipeline system 200, which can be used to perform one or more further iterations of the pipeline for updating NPC assets/data, which the game development engine 212 can use generate an updated interactive NPC scene and/or NPC assets and the like. The NPC assets and/or updates thereto may be saved and/or stored in the AMS 109, where finalized NPC assets may be stored and flagged by the user as being "pinned" (e.g. that stored NPC asset in the interactive NPC scene is flagged to not get recreated/regenerated/updated during further iterations of the game development pipeline 200 unless "unpinned"). This iterative game development process may be performed for each interactive NPC scene until each is finalised. In each iteration, the detect change component 202 detects from game development engine 212 (and/or game development client) any changes to the script, interactive NPC scene and/or NPC assets that were previously created/generated, where the further components 204-212 of the game development pipeline system 200 are used to iteratively update the NPC assets/interactive NPC scenes based on the detected changes/edits etc. Alternatively or additionally the game development pipeline system 200 and game development engine 212 may be part of or in communication with a game development builder, which is configured for performing scheduled builds of one or more versions of the video game, where the game development pipeline system 200 retrieves and/or generates all the latest NPC assets and the like for building each of the interactive NPC scenes for each build of the video game.

The game development pipeline system 200 may be configured to iteratively create or generate interactive NPC scenes based on either synthetic performance generation, studio captured performances, and/or a combination of synthetic performance generation and/or studio captured performances in relation to one or more different types of digital assets of a set of NPC data/NPC assets associated with NPCs within an interactive NPC scene, which may include, without limitation, for example:

1) Fully synthetic NPC assets/sets of NPC data—where, from each created NPC line of dialogue for each NPC in a script, a synthetic voice/audio digital NPC asset is created corresponding to the NPC dialogue, a synthetic facial performance digital NPC asset is created, and synthetic body performance digital NPC asset is created, all of which may form a set of NPC data for said each NPC and may be applied to an NPC rig/model to form a synthetic NPC asset for said each NPC. This may be shippable quality using synthetic performance.

2) a first type of Hybrid synthetic/person NPC assets/sets of NPC data—where, from each created NPC line of dialogue for each NPC in a script, a vocal digital NPC asset based on a studio recording of a person's voice/audio performance is created corresponding to the NPC dialogue, a facial digital NPC asset based on a synthetic NPC facial performance is created, and a body digital NPC asset based on a synthetic NPC body performance is created, all of which may form a set of NPC data for said each NPC that is applied to an NPC rig/model to form a first type of hybrid synthetic/person NPC asset for said each NPC.

3) a second type of Hybrid synthetic/person NPC assets/NPC data—where, from each created NPC line of dialogue for each NPC in a script, vocal digital NPC asset based on a studio recording of a person's voice/audio performance is created corresponding to the NPC dialogue, a facial digital NPC asset based on a studio recording of a person's facial motion capture performance is created, and a body digital NPC asset based on a synthetic NPC body performance is created from the text to performance, all of which may form a set of NPC data for said each NPC that is applied to an NPC rig/model to form a second type of hybrid synthetic/person NPC asset for said each NPC.

4) Full person NPC assets/NPC data—where, from each created NPC line of dialogue for each NPC in a script, a vocal digital NPC asset based on a studio recording of a person's voice/audio performance is created corresponding to the NPC dialogue, a facial digital NPC asset based on a studio recording of a person's facial motion capture performance is created, and a body digital NPC asset based on a studio recording of a person's body motion capture created from a performance of the person in relation to the NPC dialogue in the script, all of which may form a set of NPC data for said each NPC that is applied to an NPC rig/model to form a full person NPC asset for said each NPC.

Although several different types of NPC assets have been described such as Fully synthetic NPC assets, first type of Hybrid synthetic/person NPC assets, second type of Hybrid synthetic/person NPC asset, and/or Full person NPC assets, this is by way of example only and the game development pipeline system 200 is not so limited, it is to be appreciated by the skilled person in the art that each of these and/or other variations of these NPC assets may be created, updated and/or generated in each iteration of the pipeline system 200, which may replace one or more previous NPC assets created/generated. For example, a fully synthetic NPC asset may be created/generated in relation to an NPC interactive scene to act as a placeholder performance of the NPC in a version of the interactive NPC scene until a higher quality and/or hand crafted NPC asset associated with that NPC becomes available, which subsequently replaces the corresponding NPC asset of the NPC in subsequent versions of the interactive NPC scene.

In another example, in some instances higher quality hand crafted NPC assets may be generated/created for those interactive NPC scenes that punctuate key moments of the story/timeline of a video game, which may replace any corresponding synthetic NPC performances or lower quality NPC performances. In such cases, script writers and/or game developers may iteratively use the pipeline system 200 to generate/create fully synthetic NPC assets as placeholder NPC assets for one or more of the interactive NPC scenes to rapidly get a better understanding of and develop the video game's story early in the development process. This can be used to quickly determine which key interactions work and which do not work within the video game. The pipeline system 200 further enables iterative development of each iterative NPC scene and/or NPC asset in which placeholder NPC assets may be replaced by more fully developed/formed NPC assets and/or higher quality NPC assets and the like once these are stored in the AMS 109 and/or become available to the game development pipeline system 200.

Changes to, without limitation, for example generated NPC assets, interactive NPC scenes and/or the script data thereto of the video game may be detected by the game development pipeline system 200, which is configured to retrieve, create, update and/or generate NPC assets for generating each corresponding interactive NPC scene and the like. These NPC assets and data associated with the corresponding interactive NPC scene are fed back to the game development engine 212 of the client for display to the user (e.g. script writer, developer, etc.). The game development engine 212 may use this received data to generate the interactive NPC scene for display to the user via a game development client, and/or for providing to a game builder system for including the generated interactive NPC scene during building the video game. The user may use an editor in the game development engine 212 to edit the NPC assets and/or instruct storage of the NPC assets and data representative of the interactive NPC scene in the AMS 109 and the like.

The detect change component 202 may be configured to detect changes to a script associated with an interactive NPC scene and/or changes to NPC assets/sets of NPC data for each of the NPCs in the interactive NPC scene. The changes may be received from the game development engine 212 during user edits of a script, digital assets of sets of NPC data and/or NPC assets within the game development editor of the game development client/engine 212. Alternatively or additionally, the changes may be received from game management system 108/game AMS 109 and/or source control/versioning software (e.g. Perforce) incorporated therein for operating the game AMS 109 and the like, which detects when updates/modifications to scripts, NPC assets, and/or sets of NPC data in relation to the interactive NPC scene may be made from the user and/or other users. Each of the NPC assets and/or sets of NPC data may be stored within the game AMS 109 with timestamps/versioning information and linked to one or more interactive NPC scenes and/or scripts associated therewith. Thus, changes to said NPC assets and/or sets of NPC data may be detected by comparing the timestamps of the NPC asset and/or sets of NPC data previously used when generating the interactive NPC scene, with current timestamps of the NPC asset and/or sets of NPC data stored in the game AMS 109.

For example, detect change component 202 may be configured to trigger the next stage of the game development pipeline system 200 when it detects changes from the last run of generating an interactive NPC scene or a manual run is requested. The next stage may be triggered when game AMS 109 of game management system 108, which may include versioning software/source control (e.g. Perforce), detects when changes occur in the script of an interactive NPC scene, NPC assets and/or sets of NPC data/digital assets and/or artifacts associated with the interactive NPC scene. These changes may occur when a user of a game development client/engine 212 with an associated game development editor edits and/or saves changes to sets of NPC data, NPC assets, data associated with interactive NPC scenes, edits/changes to script data of a script and/or any other data associated with the interactive NPC scene and the like, which are stored in the AMS 109 (e.g. Perforce (RTM) and/or other source control software). For example, the source control may check whether any changes are made in relation to the dialogue/script for the interactive NPC scene. For example, changes may occur based on, without limitation, for example when new localization text is received, where one or more different languages of the script may be received from translators and so need to re-run the generation of the corresponding interactive NPC scenes for each localization; a user writes/adds new dialogue to a script in relation to an interactive NPC scene; new NPC assets/sets of NPC data such as, without limitation, for example a digital asset capturing a person's voice recording in relation to one or more lines of dialogue in the script, a digital asset capturing a person motion capture performance in relation to one or more lines of dialogue in the script, a user creates a custom facial/body animation for an NPC in relation to the script corresponding to the interactive NPC scene; a user updates a facial/body animation for an NPC in relation to the script corresponding to the interactive NPC scene.

When changes are detected, the changes associated with the script and/or the changed script may be processed by scripts/dialogue component 204 to determine where changes have been made in relation to the script. This may include without limitation, for example, identifying those lines of NPC dialogue in the script that have changed; identifying those lines of dialogue in the script corresponding to one or more of the changes to NPC assets/sets of NPC data and the like; identifying those lines of dialogue associated with changes to directors notes of the script; identifying those lines of dialogue associated with any other changes in relation to NPCs within the script; and/or identifying any other changes to, without limitation, for example sets of NPC data of NPCs in the interactive NPC scene, NPC assets of NPCs in the interactive NPC scene, and/or any other data associated with the NPCs and/or the interactive NPC scene. The identified lines of dialogue in the script corresponding to the changes associated with each NPC are forwarded to the NPC audio/voice component 206.

The NPC audio/voice component 206 may process each identified line of dialogue and determine, using an audio frontend provider ma, whether to retrieve the required voice digital asset (or audio digital asset) and/or generate a voice digital asset (or audio digital asset) associated with said each identified lines of dialogue. For example, the audio frontend provider 110*a* may determine whether a voice digital NPC asset containing a real voice recording (e.g. person's voice) in relation the identified line of dialogue exists in storage by querying game AMS 109 (e.g. using Perforce (RTM) etc.). If a person's voice recording associated with the line of dialogue for an NPC exists, then the voice digital NPC asset for that NPC is retrieved from storage and transferred to hybrid pipeline to apply real studio recording of the voice digital NPC asset to the NPC's performance. However, if no voice digital NPC asset for an NPC exists based on a recording in relation to the identified line of dialogue or is out-of-date (e.g. received French text) or a person's recording is not available, then the audio frontend provider 110*a* may select an audio backend provider 112*a* from a list of audio backend providers. The user may indicate in the script which audio backend provider 112*a* to use and/or the audio frontend provider 110*a* may provide a selection of audio backend providers to the user to select. Alternatively, the audio frontend provider 110*a* may automatically select the audio backend provider based on the script, lines of dialogue and/or directors notes of the script.

The audio frontend provider 110*a* requests the selected audio backend provider 112*a* to synthetically generate one or more voice digital NPC assets associated with the identified lines of dialogue in the script of the corresponding NPCs speaking/listening (e.g. a French voice etc.) and/or the directors notes in relation to the identified lines of dialogue and the like. This process is performed for each of the identified lines of dialogue in the script corresponding to the changes associated with each NPC. For each of the identified lines of dialogue, the corresponding retrieved and/or generated voice digital NPC assets (or audio digital NPC assets) may be associated with the corresponding identified lines of dialogue, which may correspond to a speaking/listening NPCs, both of which are passed in a set of NPC data for each said NPC from the NPC audio/voice component 206 to the NPC facial and/or body performance component 208.

The NPC facial and/or body performance component 208 may process each of the identified lines of dialogue corresponding to NPCs speaking/listening and determine, using facial and/or body frontend providers 111*a* or 111*b* whether to retrieve the required facial digital NPC asset and/or body digital NPC asset from storage of AMS 109, if it exists, and/or generate a facial digital NPC asset and/or a body digital NPC asset associated with the NPCs in relation to the identified lines of dialogue, corresponding directors notes and corresponding voice digital NPC assets.

For example, the facial frontend provider 111*a* may be configured to determine whether a digital NPC asset containing a real motion capture facial recording performance of a person performing the identified lines of dialogue (e.g. a person's motion capture facial performance) exists in storage of game AMS 109. If this digital NPC asset exists, then the real person digital facial NPC asset may be retrieved from storage of game AMS 109 and included in the set of NPC data for said NPC and applied to the NPC asset. However, if no digital NPC asset containing a real motion capture facial recording of a person performing the identified lines of dialogue exists, then the facial frontend provider 111*a* may select, based on presets and/or quality and the like, one of the facial backend providers 112*b* for generating a synthetic facial digital NPC asset associated with the identified lines of dialogue corresponding to NPCs speaking/ listening (e.g. receiving) and/or corresponding directors notes in the script. Alternatively or additionally, the user may indicate in the script which facial backend provider to use depending on quality required, and the facial frontend provider 111*a* selects the corresponding facial backend provider 112*b*. Alternatively or additionally, the facial frontend provider 111*a* may provide a selection of facial backend providers 112*b* that the user may select, in which the selected facial backend provider may provide a drop down menu/ combo box for the user to select further directors notes (e.g. emotions, actions, gestures and the like) that they would like the NPC to perform, which may be saved in the script. As another option, the facial frontend provider 111*a* may automatically select the facial backend provider based on the script, lines of dialogue and/or directors notes of the script in relation to the NPCs.

The facial frontend provider 111a may send the selected facial backend provider 112b the identified lines of dialogue, the director's notes and/or other data including the voice/audio digital NPC asset associated with the NPCs performance corresponding to the identified lines of dialogue. Using this received information, the selected facial backend provider 112b is configured to generate a synthetic facial performance or animation (e.g. a facial performance such as lip synchronization that matches the vocal performance of the NPC and/or facial expressions synchronized to the vocal performance of the NPC) associated with the NPCs performing the identified lines of dialogue and/or using the corresponding voice/audio NPC assets and the like. The facial backend provider 112b may return one or more facial digital NPC assets for each NPC, each containing data representative of a facial performance of the corresponding NPC performing the identified lines of dialogue. The returned facial digital NPC asset may be included in the set of NPC data for said NPC, where the set of NPC data for each NPC is subsequently applied to a rig/model of the NPC to generate the NPC asset for that NPC.

The body frontend provider 111b may be configured to determine whether a body digital NPC asset containing a real motion capture body recording of a person performing the identified lines of dialogue (e.g. a person's motion capture body performance) exists in the storage of game AMS 109. If this body digital NPC asset exists, then the real person digital body NPC asset may be retrieved from storage and included in the set of NPC data for said NPC and may be subsequently applied to the NPC asset. However, if no body digital NPC asset containing a real motion capture body recording of a person performing the identified lines of dialogue exists, then the body frontend provider 111b may select, based on presets and/or quality and the like, one of the body backend providers 112C for generating a synthetic body digital NPC asset associated with the identified lines of dialogue corresponding to NPCs speaking/listening (e.g. receiving) and/or corresponding directors notes in the script. Alternatively or additionally, the user may indicate in the script which body backend provider to use depending on quality required, and the body frontend provider 111b selects that body backend provider for generating the synthetic body digital asset. Alternatively or additionally, the body frontend provider 111b may provide a selection of body backend providers that the user may select, in which the selected body backend provider may provide a drop down menu/combo box for the user to select further directors notes (e.g. emotions, actions, gestures and the like) that they would like the NPC to perform, which may be saved in the script. Alternatively, the body frontend provider 111a may be configured to automatically select the body backend provider based on the script, lines of dialogue and/or directors notes of the script.

The body frontend provider 111b may send the selected body backend provider 112C the identified lines of dialogue, director's notes and/or other data including the voice/audio digital NPC asset associated with the NPCs performance corresponding to the identified lines of dialogue. Using this information, the selected body backend provider 112C is configured to generate a synthetic body performance or animation based on the identified lines of dialogue and/or directors notes (e.g. a body performance such as actions of the NPC (e.g. "pointing", "shrugging", "whooping", "jumping" etc.) and/or emotions (e.g. "happily jumping", "angrily stamping", and/or "angrily punching fists" etc.). The body backend provider 112C may return one or more body digital NPC assets for each NPC, each containing data representative of a body performance (or animation) of the corresponding said each NPC performing the identified lines of dialogue. For example, the body backend provider 112C may generate data representative of a body performance/animation for an NPC that has action based on text in the lines of dialogue/script and/or corresponding directors notes in the script, and/or directors notes selected by a user from a dropdown menu/combo box of predefined actions, emotions, gestures and the like (e.g. an NPC may mention pointing in the text with a directors notes indicating pointing, then the body NPC animation may perform a pointing action; or an NPC says "no", then the body NPC animation may perform a shaking head motion etc.). The returned body digital NPC asset may be included in the set of NPC data for each said NPC and subsequently applied to a rig/model for the NPC to generate the NPC asset for the NPC.

The game development pipeline system 200 is configured to use the pipelined detect change component 202, a scripts/dialogue processing component 204, an NPC audio/voice component 206, an NPC facial/body performance component 208 to iteratively process the script including each of the lines of dialogue between NPCs within the script and/or directors notes of an interactive scene to generate/retrieve and/or update the corresponding NPC assets in relation to each of the NPCs performing the lines of dialogue within the script. The NPC asset for an NPC represents the performance of the NPC performing the lines of dialogue within the script. The NPC asset for the NPC may be updated or generated based on applying the set of NPC data including the vocal/audio digital NPC asset of the NPC vocalizing the lines of dialogue, the facial digital NPC asset of the NPC including a facial performance (e.g. animation) of the NPC performing the lines of dialogue, and the body digital NPC asset of the NPC including a body performance (e.g. animation) of the NPC performing the lines of dialogue to an NPC rig/model associated with the NPC. The NPC rig/model for an NPC may be predefined/predetermined and/or selected by the user. For each of the lines of dialogue of the script, the NPC facial/body performance component 208 may output data representative of at least the corresponding NPC assets and the corresponding lines of dialogue for combining into an interactive NPC scene. The NPC facial/body performance component 208 may also forward the NPC rig/model used for each NPC asset and the sets of NPC data including the vocal/audio digital NPC asset of the NPC vocalizing the lines of dialogue, the facial digital NPC asset of the NPC including a facial performance (e.g. animation) of the NPC performing the lines of dialogue, and the body digital NPC asset of the NPC including a body performance (e.g. animation) of the NPC performing the lines of dialogue. This NPC asset data and at least the lines of dialogue of the script may be passed to the cinematography component 210 for generating the data representing the cinematic scene and/or the game development engine component 212 for generating the interactive NPC scene. The cinematic scene/interactive NPC scene generated by the game development engine component 212 may be displayed to a user via the game development client 102a. Any new NPC asset data or NPC assets may also be displayed to the user for editing, which may require further iterations through the game development pipeline 200 for updating the corresponding set of NPC data and/or NPC assets for each NPC, where the game development engine component 212 generates the updated interactive NPC scene, which may be redisplayed to the user via a game development client 102a and the like. The user may finally approve and or instruct saving of the new set of NPC data, new NPC asset data and/or NPC assets/interactive NPC scene to be stored in the game AMS 109 (e.g. using Perforce (RTM) etc.) for later retrieval/updates/builds and the like.

The cinematography component 210 receives the NPC asset data and at least the lines of dialogue of the script. The line-by-line performance of each NPC in the script may be processed by combining the NPC assets corresponding to each respective lines of dialogue in the script to form an entire cinematic sequence of the script, which may be used by the game development engine component 212 to form an interactive NPC scene. Given that there may be an NPC asset corresponding to each NPC performing each line of the dialogue in the script, the cinematic component 210 may process, without limitation, for example animation motion curves of the NPC assets of each NPC to ensure the animation of an NPC asset of the NPC for a line of dialogue smoothly transitions to the next NPC asset of the NPC for the next line of the dialogue involving the NPC. This is performed for all NPCs to form data representative of a cinematic sequence of the interactive NPC scene in relation to the script. In addition, the cinematography component 210 may determine locations of the NPC assets of each NPC within the computer game environment of the video game, and may apply a camera solver to the computer game environment for positioning virtual cameras or camera framing within in the region containing the locations of the NPC assets of each NPC. The camera solver may be configured to use a combination of heuristics and/or a machine learning camera solver to initially position the virtual cameras to fit the physical space of the region in which the interactive NPC scene may take place. For example, the camera solver may converge on one or more virtual camera positions that make sense in relation to the region of the computer game environment containing the interactive NPC scene. The camera solver may also use recommended camera positions or predetermined camera locations, or camera positions set by the user editing the interactive NPC scene.

The cinematography component 210 may send the generated cinematic/camera data and also data representative of all the NPC assets of each NPC in relation to the lines of dialogue, the cinematic sequence, the positions of the virtual cameras and/or the positions/locations of the NPC assets within the computer environment to the game development engine component 212, which is configured to create the full interactive NPC scene using a game development engine (e.g. Frostbite (RTM) or other engine known to those of skill in the art) and the like. Using the received NPC data, the game development engine component 212 may use, for example, the game development engine 104a and game development client 102a generate and display the interactive NPC scene to a user. The script data, any new NPC asset data or NPC assets may also be displayed to the user for editing, which may cause further changes to be detected and thus require further iterations of processing through the game development pipeline 200 for updating the corresponding NPC assets and display an updated interactive NPC scene. The user using the game development engine component 212 may finally approve and or simply save the new NPC asset data and/or NPC assets/interactive NPC scene prior to this data being stored in the game AMS 109 (e.g. using Perforce (RTM) etc.) for later retrieval/updates/builds of the video game and the like.

The game development pipeline system 200 may also be used by a video game building machine, which may perform a scheduled build of the entire video game, where the video game includes a plurality of scripts, which are all processed by the game development pipeline system 200 to generate a corresponding plurality of interactive NPC scenes using the most up-to-date NPC assets/sets of NPC data for each NPC in the plurality of scripts. The video game building machine may perform the scheduled build of the video game across all possible computing platforms that may execute the video game including building the video game across, without limitation, for example all possible SKUs of graphics cards; Xbox (RTM); Nintendo Switch (RTM); PlayStation (RTM); Oculus VR (RTM); Personal Computers; and/or any other computing platform. Thus, all the interactive NPC scenes are built using the game development pipeline system 200 on a regular schedule. The builds and corresponding interactive NPC scenes may also be stored in the game AMS 109 for later retrieval/updating and the like. Users may retrieve the most up-to-date version of the game after each scheduled build and proceed to edit the corresponding script, one or more interactive NPC scenes, NPC assets, digital NPC assets and the like which may be re-generated using the game development pipeline system 200 via their client computing devices. This iterative process may be performed by all users in a game development team to rapidly develop the video game.

Further modifications may be made to the game development pipeline systems 110, 106a, 200 and corresponding processes 130, 150 and/or 170 as described with reference to FIGS. 1a to 2. Although each of the components 202-212 of game development pipeline system 200 have been described with reference to FIGS. 1a-1e and 2, this is by way of example only but the game development pipeline system 200 is not so limited, it is to be appreciated by the skilled person that the detect change component 202, the scripts/dialogue processing component 204, the NPC audio/voice component 206, the NPC facial and/or body performance component 208, the cinematography component 210, which is coupled to the game development engine component 212 (e.g. game development engine 106a or 126 and the like) may include further corresponding functionality and/or processes as described with reference to FIGS. 3a to 3e.

Figure 3A:
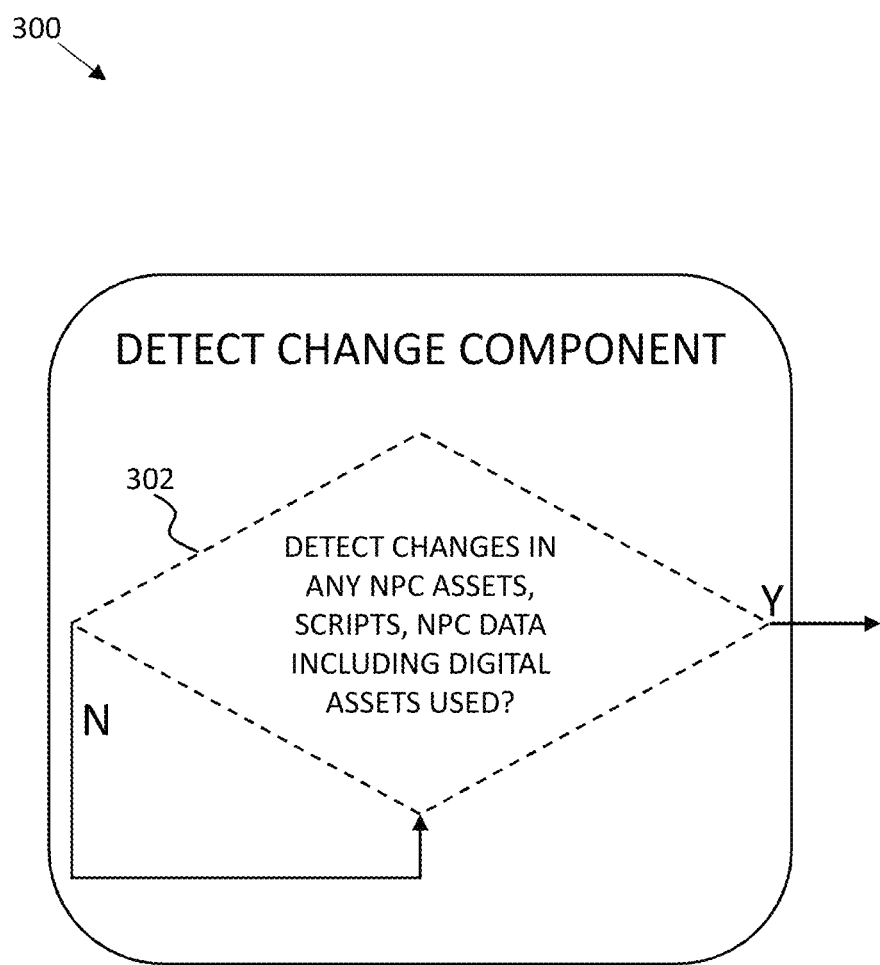
FIG. 3a illustrates an example detect change component for use in game development pipeline systems of FIG. 1a, 1b and/or 2 according to some embodiments of the invention.

FIG. 3a illustrates an example detect change component 300 for use in game development pipeline systems 104a, 110, 200 and/or processes 130, 150, 170 with respect to FIGS. 1a-1e and/or 2, combinations thereof, modifications thereto and/or as herein described. The detect change component 300 includes a detect change process that determines whether a change has occurred in relation to, without limitation, for example any NPC assets, sets of NPC data, and/or scripts used in relation to one or more interactive NPC scenes associated with the video game.

For example, detect change component 300 includes a detect change process 302 for determining when a change in relation to an interactive NPC scene occurs for triggering the pipeline system to generate one or more interactive NPC scenes of a video game. When one or more changes occur (e.g. Y), then the detect change component 300 may be triggered to proceed to the next stage associated with identifying the lines of dialogue corresponding to the NPCs speaking/listening and associated data corresponding to the changes from the script. When a change does not occur (e.g. N), then the detect change component 300 may simply wait until a change occurs, or that it may be periodically triggered during a build run of the video game and/or manually triggered by a user for building the video game and/or corresponding interactive NPC scene.

The detect change process 302 may receive change indications from the game AMS 109 of game management system 108, which may be implemented to include a software control/versioning control system such as, without limitation, for example Perforce (RTM) and the like. The versioning software or source control provider (e.g. Perforce (RTM) may have a change list in relation to all interactive NPC scenes in the video game. The change list may include, without limitation, for example all of the scripts, all of the sets of NPC data associated with each script, all NPC assets associated with each script, all cinematography data (e.g. NPC asset locations within the computer game environment, virtual camera locations and camera framing in the computer game environment and the like) associated with each interactive NPC scene, all generated NPC scenes associated with each script. Thus, any change in the change list may be used by the software control to trigger the detect change process 302. For example, the last time the detect change component 300 was triggered, the audio files associated with an NPC scene were on revision 7, now they have been updated to revision 8, which indicates a change has occurred, so the game development pipeline 200 may need to be run again, hence the detect change process 302 may be triggered. This provides the advantage of ensuring a user is working on the latest version of the NPC assets, sets of NPC data, scripts associated with the interactive NPC scene.

The detect change component 300 may also receive change indications from one or more game development engines 212 used by users creating, editing and/or updating the interactive NPC scene. Thus, any user edits, updates, changes to at least the script of an interactive NPC scene (e.g. one or more lines of dialogue and/or directors notes and the like), the sets of NPC data associated with the script, the NPC assets associated with the script, and/or cinematography data associated with each interactive NPC scene, and/or previous run of a generated NPC scene associated with the script may be passed as input to the detect change process 302 for triggering operation of the game development pipeline 200 and the like.

The detect change component 300 may be configured to trigger the next stage of the game development pipeline system 200 when it detects changes from the last run of generating an interactive NPC scene, when a build is required at a predetermined time and/or schedule, and/or when a manual run is requested by a user and/or operator and the like.

Although changes from a change list of software control (e.g. Perforce (RTM)) and/or user edits made in a game development editor of a game development engine 212 may be used to trigger the process 302, this is by way of example only and the game development pipeline system 200 is not so limited, it is to be appreciated by the skilled person that any other type of trigger such as, without limitation, for example triggering the game development pipeline system 200 to update the interactive NPC scene after a threshold number of changes in relation to an interactive NPC scene have occurred, and/or sending a trigger signal to a user or operator to manually permit triggering of the game development pipeline system 200 after the threshold number of changes have occurred, combinations thereto, modifications thereof and/or as the application demands.

Figure 3B:
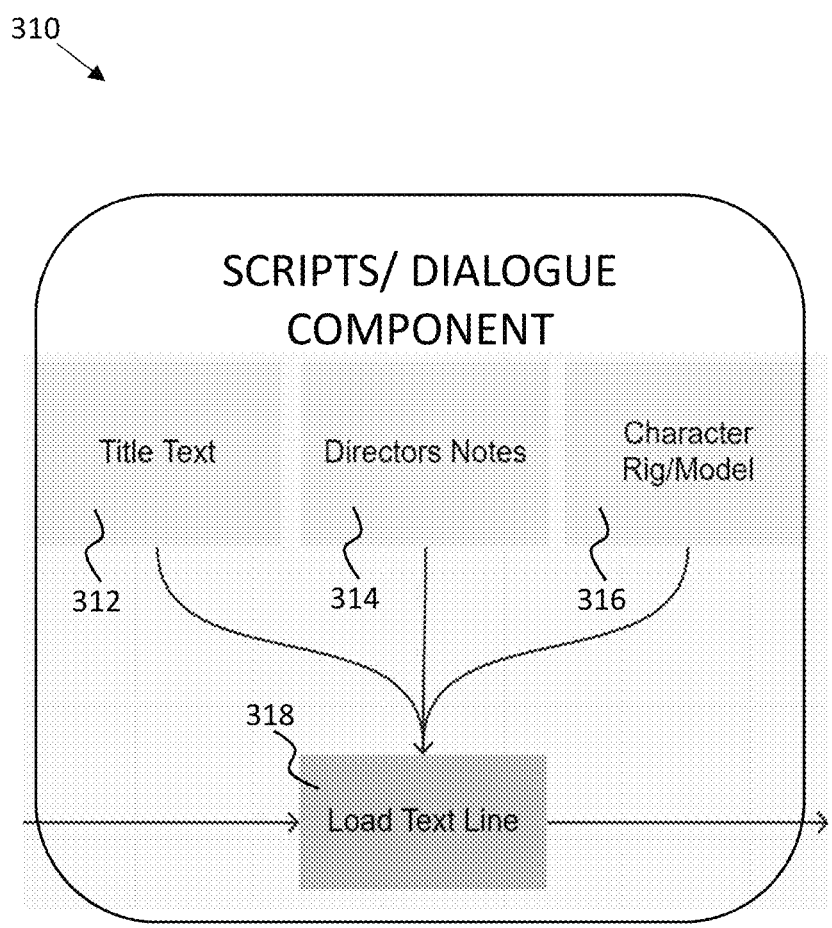
FIG. 3b illustrates an example scripts/dialogue component for use in game development pipeline systems of FIG. 1a, 1b and/or 2 according to some embodiments of the invention.

FIG. 3b illustrates an example scripts/dialogue component 310 for use in game development pipeline systems 104a, 110, 200 and/or processes 130, 150, 170 with respect to FIGS. 1a-1e and/or 2, combinations thereof, modifications thereto and/or as herein described. Once triggered, either manually or overnight due to file changes in relation to the interactive NPC scene, the scripts/dialogue component 310 of the pipeline loads all dialogue lines and director's notes from the raw source material format. For example, when detected changes trigger the detection process 302, the detect change component 300 may send the detected changes in relation to the scripts/dialogue to the scripts/dialogue component 310, which identifies NPC interactions, from the corresponding script, such as the lines of dialogue corresponding to the NPCs speaking/listening associated with the changes. The script includes the title text 312 (e.g. lines of dialogue associated with the video game), the directors notes 314 that supplement the lines of dialogue in the script (e.g. emotions, actions, gestures, director instructions associated with the NPC performing the corresponding line of dialogue), and the NPC rig/model 316 used in relation to the NPCs speaking/listening. As described with reference to FIGS. 1a to 2, the directors notes for an NPC may be selected from one or more drop down menus/combo boxes including lists of possible directors options including, without limitation, for example NPC emotions, actions, gestures, director instructions associated with the NPC performing the corresponding line of dialogue and the like along with timing information associated with the selection in relation to when and how the NPC performs according to the selected directors notes. In the identification and load process 318, the scripts/dialogue component 310 identifies and loads 318 the lines of dialogue corresponding to the NPCs speaking/listening and associated NPC data 312, 314 and/or 316 within the script in relation to each of the detected changes. The identified lines of dialogue corresponding to NPCs speaking/listening and associated NPC data 312, 314 and/or 316 for an NPC within the script in relation to each of the detected changes is sent to the NPC audio/voice component 320 for further processing in relation to the changes.

Alternatively and/or additionally, when the detect change component 300 is triggered manually and/or on a predetermined schedule for a video game build, the detect change component 300 may detect changes associated with one or more interactive NPC scenes and send these to the scripts/dialogue component 310. In such a case, the scripts/dialogue component 310 may load all the lines of dialogue and associated director's notes and the like for each script in relation to each NPC in the scene corresponding to said each script. Alternatively or additionally, if an entire re-run of the pipeline is required for an interactive NPC scene and/or for all interactive NPC scenes during a video game build, then the detect change component 300 may indicate that the entire interactive NPC scene and/or all the interactive NPC scenes of the video game have been changed to force the pipeline to run on the latest version of the scripts, NPC assets, sets of NPC data and the like for re-generating the interactive NPC scenes. The scripts/dialogue component 310 identifies and loads all the lines of dialogue within each script and associated NPC data 312, 314, and/or 316 for every interactive NPC scene of the video game in relation to each of the detected changes.

In any event, the scripts/dialogue component 310 identifies, loads and sends each of the lines of dialogue corresponding to the NPCs speaking/listening within the script associated with the detected changes. An NPC asset data package is created including data representative for each of the identified lines of dialogue corresponding to the NPCs speaking/listening and associated NPC data 312, 314 and/or 316 for the NPCs within the script associated with the detected changes is sent to the NPC audio/voice component 320 for further processing of each NPC asset/sets of NPC data including digital assets (e.g. voice/audio or facial/body animation) in relation to the changes. At each stage of the pipeline, data representative of additional digital assets associated with sets of NPC data and/or NPC assets and the like are generated and/or retrieved are accumulated into the NPC asset data package for the NPCs in the script in relation to the detected changes.

Figure 3C:
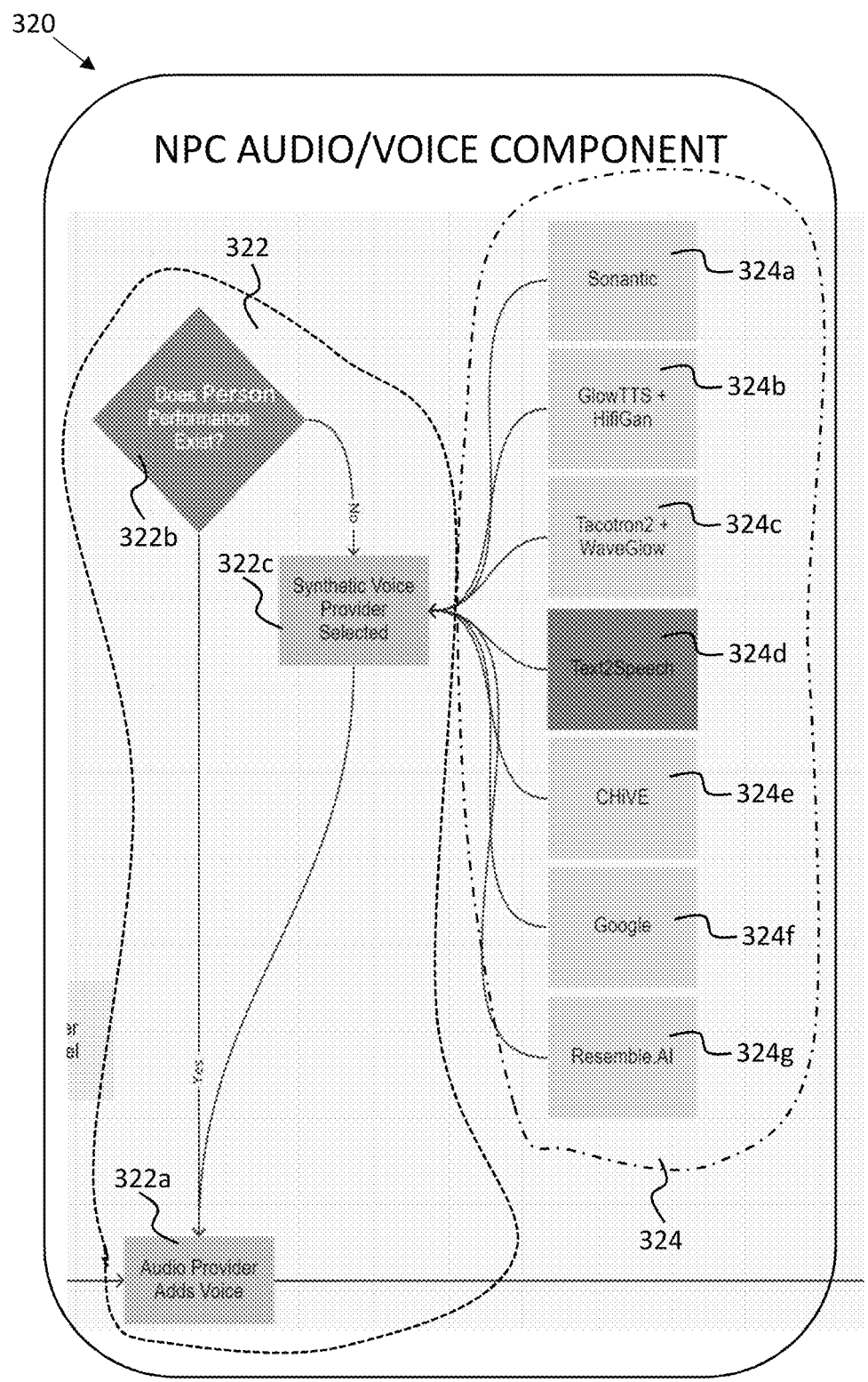
FIG. 3c illustrates an example NPC audio/voice component for use in game development pipeline systems of FIG. 1a, 1b and/or 2 according to some embodiments of the invention.

FIG. 3c illustrates an example NPC audio/voice component 320 for use in game development pipeline systems 104a, 110, 200 and/or processes 130, 150, 170 with respect to FIGS. 1a-1e and/or 2, combinations thereof, modifications thereto and/or as herein described. The NPC audio/voice component 320 receives each NPC asset data package from the script/dialogue component 310. The NPC asset data package, at this stage, includes data representative for each of the identified lines of dialogue corresponding to the NPCs speaking/listening and associated NPC data 312, 314 and/or 316 for NPCs within the script associated with the detected changes. The NPC audio/voice component 320 includes an audio frontend provider 322 coupled to an audio/voice backend provider group 324. The audio frontend provider 322 includes an audio/voice input/output service 322a that receives the NPC asset data package from the scripts/dialogue component 310 as input.

The audio/voice backend provider group 324 includes a plurality of audio/voice backend providers 324a-324g each of which is configured to generate synthetic voice/audio digital NPC asset based on data representative of each of the identified lines of dialogue and/or associated NPC data 312, 314 and/or 316 for each of the NPCs. Each audio/voice backend provider 324a of the plurality of audio/voice backend providers 324a-324g may be configured to use different algorithms/processes for generating synthetic voice/audio digital NPC assets based on data representative of each of the identified lines of dialogue and/or associated NPC data 312, 314 and/or 316 for each NPC, which may be of different qualities and/or accuracy and the like. For example, the audio/voice backend providers 324a-324g may include a provider such as, without limitation, for example Sonantic (RTM) 324a, GlowTTS (RTM)+HiFiGan 324b, Tacotron2+ WaveGlow (RTM), Text2Speech 324d, CHiVE (RTM) 324e, Google (RTM) text-to-speech 324f, and/or Resemble.AI (RTM) 324g, and/or any text-2-speech provider/generator and/or machine learning text-2-speech provider/generator and the like. An audio/voice backend provider may be selected based on user preferences and/or the quality standard set for the video game (e.g. this may be specified in the script), e.g. a AAA video game title may use a higher quality provider compared with a standard video game title. This may be changed from low quality audio/voice to increasing qualities of audio/voice generation depending on what stage in the video game is in the game development cycle.

For example, the audio/voice input/output service 322a receives the NPC data package from the scripts/dialogue component 310 in which the NPC audio/voice component 320 performs a real-person voice digital NPC asset check 322b to determine whether real person performances and/or audio recordings in relation to the identified lines of dialogue exists by querying game AMS 109 (e.g. using Perforce (RTM) and/or any other asset management/control/versioning system known to those of skill in the art). This may be always attempted first and may be used first if they are available. For example, the audio/voice frontend provider 322 may query the source control/game AMS 109 (e.g. Perforce (RTM) Backend Provider) to determine whether a custom audio/voice digital NPC asset, or real person performance exists in the storage in relation to the line of dialogue, which, for example, the Perforce (RTM) backend provider may return, from the game AMS 109, the existing voice digital NPC asset to the audio/voice frontend provider 322. Otherwise, if a synthetic voice/audio in relation to the identified line of dialogue and detected changes is required, then a synthetic voice provider service 322c may select one of the audio/voice backend providers 324a-324g for generating synthetic voice digital NPC assets associated with the identified lines of dialogue corresponding to each of the NPCs speaking/listening. The user may have indicated in the script which audio/voice backend provider 324a-324g to use. The user may also have included in the script one or more directors notes with selected directors options such as, for example, voice performance options specific to the selected audio/voice backend provider 324a that the user may have chosen for use by the selected audio/voice backend provider 324a in generating the desired synthetic NPC voice performance. Alternatively or additionally, if no audio/voice backend provider 324a-324g has been preselected, the synthetic voice provider service 322c may provide a selection of audio/voice backend providers 324a-324g to the user to select. A selected audio/voice backend provider 324a may provide the user with a drop down menu/combo box of directors notes/directors options specific to the selected audio/voice backend provider 324a that the user may choose from in relation to generating the desired synthetic NPC voice performance. Alternatively or additionally, the synthetic voice provider service 322c may be configured to automatically select the audio backend provider and required directors options based on the script, lines of dialogue and/or directors notes of the script. The synthetic voice provider service 322c requests the selected audio backend provider 324a to synthetically generate one or more voice digital NPC assets associated with each of the identified lines of dialogue in the script of the corresponding NPCs speaking/listening and/or the directors notes/options selected in relation to the identified lines of dialogue and the like. The retrieved or synthetically generated voice digital NPC asset that is generated may be passed to the audio/voice input/output service 322a.

The audio/voice frontend provider 322 includes audio/voice provider input/output service 322a, which is also configured to add the retrieved/generated audio/voice digital NPC assets of each NPC in relation to the received identified lines of dialogue corresponding to the NPCs speaking/listening to a set of NPC data of said each NPC. The set of NPC data for each NPC may be inserted into a second NPC asset data package including data representative of the received first NPC package for output. The resulting second NPC package (e.g. audio/voice digital NPC assets of the sets of NPC data, identified lines of dialogue associated with the NPC and the like) is sent to the next stage in the pipeline. That is, the audio/voice frontend provider 322 is responsible for retrieving and/or generating text to speech for each identified lines of dialogue corresponding to the NPCs speaking/listening. It accepts the entire lines of dialogue, along with the director's notes 314 (e.g. including voice, facial and/or body performance options specific to one or more voice, facial and/or body backend providers) for the dialogue corresponding to the NPCs speaking/listening, and it returns a real audio capture if it exists from querying game AMS 109 (e.g. a real up-to-date audio capture is found in the game AMS 109) of the voice/audio digital NPC assets, otherwise one of the synthetic backend providers 324a-324g is selected to generate audio/voice digital NPC asset from at least the lines of dialogue for each of the NPCs and any relevant directors notes/options, if available in the script or selected by a user when prompted by the selected synthetic backend provider. Director voice performance options (e.g. emotions) may be a pre-selected choice provided by the synthetic audio backend provider, which may be passed to the user to directly select the most appropriate director options from the available options of that synthetic audio backend provider. For example, the NPC audio/voice component 320 audio/voice frontend provider 322 provides, without limitation, for example a voice digital NPC asset including the pulse code modulated (PCM) audio output for the identified line of dialogue for each received NPC package with correct emotional inflection based upon associated director's notes 314, selected director options and/or context of the script and the like. Although raw audio PCM may be returned as a voice/audio digital NPC asset of the NPC in relation to the identified line of dialogue, audio compression may be used depending on network bandwidth and the like.

For example, the audio/voice provider input/output service 322a may return a set of NPC data for each NPC including voice digital NPC asset for each of the NPCs associated with the identified lines of dialogue corresponding to the NPCs speaking/listening based on, without limitation, for example raw PCM audio/voice data and/or compressed PCM audio/voice data. The audio/voice provider input/output service 322a may add data representative of the retrieved/generated voice digital NPC asset for the NPC in relation to the identified lines of dialogue of the corresponding NPC data package into a set of NPC data for the NPC, which may be further included to update the NPC asset data packet for sending. The audio/voice provider input/output service 322a sends the updated NPC data package, which includes data representative of the identified lines of dialogue of the NPC, script and other data 312, 314 and/or 316 and the sets of NPC data of the NPCs including voice/audio digital NPC assets of the NPCs associated with the identified lines of dialogue corresponding to the NPCs speaking/listening, to the NPC facial/body performance component 330 of the game development pipeline 200. That is, for each identified lines of dialogue corresponding to the NPCs speaking/listening, the voice/audio, combined with the text for the identified lines of dialogue, and the director's notes 314 and the like are passed to NPC facial/body performance component 330.

Figure 3D:
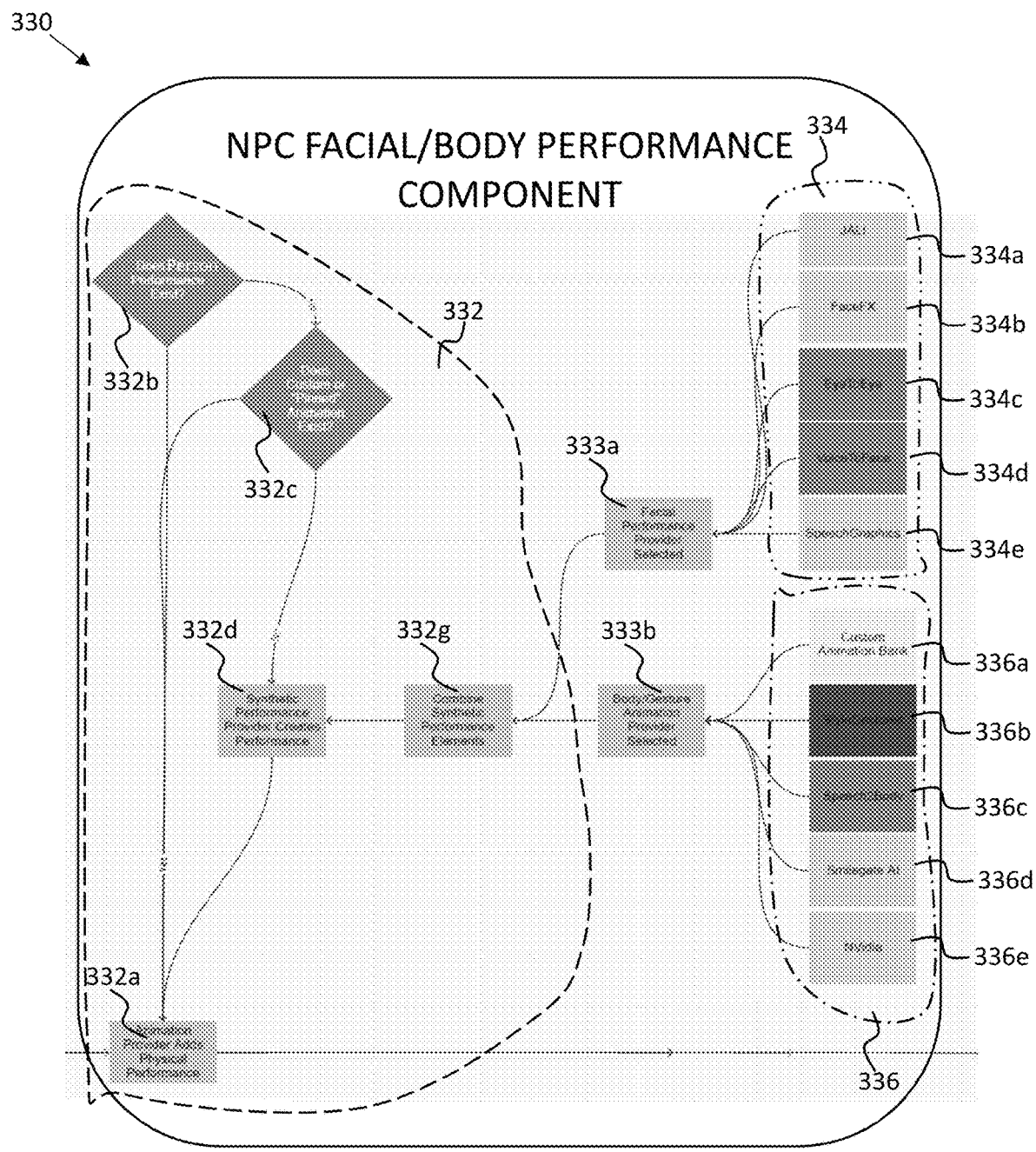
FIG. 3d illustrates an example NPC facial/body performance component including a facial performance component and a body performance component for use in game development pipeline systems of FIG. 1a, 1b and/or 2 according to some embodiments of the invention.

FIG. 3d illustrates an example NPC facial/body performance component 330 including an animation performance frontend component 332, facial performance frontend provider component 333a, body performance frontend provider component 333b, facial backend provider group 334 and body backend provider group 336 for use in game development pipeline systems 104a, 110, 200 and/or processes 130, 150, 170 with respect to FIGS. 1a-1e and/or 2, combinations thereof, modifications thereto and/or as herein described. The animation performance frontend component 332 includes animation provider input/output service 332a that receives each NPC data package from the audio/voice provider input/output service 322a. The NPC data package includes data representative of the identified lines of dialogue corresponding to the NPCs speaking/listening and other data 314/316 and the corresponding sets of NPC data for each NPC including voice/audio digital assets of each of the NPCs associated with the identified lines of dialogue corresponding to the NPCs speaking/listening and the like.

For example, the received NPC package sent from the audio/voice frontend provider 322 includes the audio/voice digital NPC asset of the set of NPC data, combined with the text for each identified lines of dialogue corresponding to the NPCs speaking/listening and/or the director's notes/options 314, which are passed to the animation performance frontend component 332. The animation performance frontend component 332 may be configured to retrieve and/or generate, without limitation, for example the lip sync and facial performance that pairs with the NPC speaker, the NPC speaker's line, and the NPC listener/receiver of the identified lines of dialogue corresponding to the NPCs speaking/listening or receiving. The animation performance frontend component 332 may also retrieve and/or generate the receiver's expression from either a bank, or via an ML inference engine. These may be combined into facial and/or body NPC assets representing a facial and/or body performance of each NPC. The resulting facial and/or body digital NPC assets for these NPCs may be included in the corresponding sets of NPC data for each NPC, which may be intermediate facial and/or body animation files. The sets of NPC data for each NPC, which now include voice/audio digital NPC assets and facial and/or body digital NPC assets for said each NPC, are returned and output via the animation provider input/output service 332a for addition to the corresponding NPC package for delivery and integration into an NPC rig/model and/or later importation into the target game development engine 212 and the like.

The facial backend provider group 334 includes a plurality of facial backend provider components 334a-334e each of which is configured to generate synthetic facial animation digital NPC asset or synthetic facial digital NPC asset (e.g. intermediate animation file format) based on data from the received NPC package. The received NPC package includes data representative of an identified lines of dialogue corresponding to the NPCs speaking/listening and/or associated NPC data 312, 314 and/or 316 for each NPC, and corresponding sets of NPC data including voice/audio digital NPC assets for said each NPC and the like. For example, the facial animation backend provider components 334a-334e may include access to providers such as, without limitation, for example JALI (RTM) 334a, FaceFX (RTM) 334b, EyeToEye (RTM) 334c, VoiceToFace (RTM) 334d, SpeechGraphics (RTM) 334e, and/or any other text-2 facial animation provider/generator, voice-2-facial animation provider/generator and/or machine learning facial animation provider/generator and the like.

The body backend provider group 336 includes a plurality of body backend provider components 336a-336e each of which is configured to generate synthetic body animation digital NPC asset or synthetic body digital NPC asset (e.g. intermediate animation file format) based on data representative of the received second NPC package. The received NPC package includes data representative of the identified lines of dialogue corresponding to the NPCs speaking/listening and/or associated NPC data 312, 314 and/or 316 for one or more NPCs and corresponding sets of NPC data including voice/audio digital NPC assets for each NPC and the like. For example, the body animation backend provider components 336a-336e may include providers such as, without limitation, for example a custom animation bank 336a, StyleGestures (RTM) 336b, Speech2Body (RTM) 336c, Smilegate AI (RTM) 33gd, NVidia (RTM)3336e, and/or any other text-2 body animation provider/generator, voice-2-body animation provider/generator and/or machine learning body animation provider/generator and the like.

For example, the animation performance frontend component 332 is configured, via animation provider input/output service 332a, to add, if required, data representative of a facial and/or body animation digital NPC assets for an NPC to the set of NPC data for that NPC, which may then be added to the NPC asset data package, in relation to any physical performance of the NPCs within the interactive NPC scene. In order to do this, the animation frontend provider 332 will use a facial and/or body checking service 332b for performing a real-person facial digital NPC asset check and/or body digital NPC asset check to determine whether real person performances of facial motion capture exists and/or real person performances of body motion capture exists in storage of game AMS 109 (e.g. using Perforce(RTM) etc.) in relation to either the identified lines of dialogue corresponding to the NPCs speaking/listening, the corresponding voice/audio digital assets, and/or both that are received in the received NPC asset data package. The real-person facial and/or body digital NPC asset checks may always be attempted first, and are used if these types of digital assets are available. For example, the animation frontend provider 332 may query the source control/game AMS 109 (e.g. Perforce (RTM) Backend Provider) to determine whether custom facial and/or body digital NPC assets exist, or a facial and/or body digital NPC asset based on a real person facial and/or body motion capture performance exists in relation to the identified lines of dialogue corresponding to the NPCs speaking/listening and/or corresponding voice/audio digital NPC assets. For example, the Perforce (RTM) backend provider may return any up-to-date existing facial and/or body animation digital NPC assets to the NPC animation input/output service 332a for inclusion into the corresponding set of NPC data for that NPC, which may then be added to the received NPC package.

Should the real-person digital facial and/or body asset check of the body and/or facial checking service 332b fail to find, from game AMS 109, a digital facial NPC asset corresponding to a facial performance of a real-person or a digital body NPC asset corresponding to a body performance of a real-person, then another body and/or facial checking service 332c determines whether a corresponding digital facial NPC asset and/or a corresponding digital body NPC asset exists in game AMS 109 that has an indication that it has been "pinned" or finalised by one of the users of the game development clients 102a-102n. For example, a user of the game development client iota may consider a facial digital NPC asset and/or corresponding body digital NPC asset for an NPC in relation to the identified lines of dialogue corresponding to the NPCs speaking/listening is of the required quality for the video game, in which case these facial digital NPC assets/body digital NPC assets are saved to AMS 109 with an indication that they are "pinned" or finalised and should not be re-generated and/or synthesized. If after querying the storage of game AMS 109 (e.g. using Perforce (RTM) or other source control/versioning) that a corresponding facial digital NPC asset and/or a corresponding body digital NPC asset exists with an indication that it has been "pinned" or finalised, then the "pinned" facial digital NPC assets and/or "pinned" body digital NPC assets are retrieved and included into the corresponding set of NPC data for that NPC and output to the NPC animation input/output service 332a for adding to the received NPC package. It is noted, that one or more users may, at some later time or stage, remove the "pinned" or finalised indication from a "pinned" facial digital NPC asset and/or a "pinned" body digital NPC assets should these assets require updating/modification and the like.

Should a "pinned" or finalised facial digital NPC asset and/or "pinned" or finalised body digital NPC asset not exist in game AMS 109 in relation to the identified lines of dialogue corresponding to the NPCs speaking/listening, then synthetic facial/body performance creation service 332d is used to create the required synthetic facial digital NPC assets and/or synthetic body digital NPC assets in relation to the identified lines of dialogue corresponding to the NPCs speaking/listening for each NPC. When a synthetic facial animation digital NPC asset is to be created, a synthetic facial performance provider service 333a selects one of the synthetic facial backend provider components 334a-334e depending on the quality level and/or other requirements in relation to the video game, which may be set by a user and/or the game development team. When a synthetic body animation digital NPC asset is to be created, a synthetic body performance provider service 333b selects one of the synthetic body backend providers 336a-336e depending on the quality level and/or other requirements in relation to the video game, which may be set by a user and/or the game development team.

If a synthetic facial animation digital NPC asset is to be created, the synthetic facial performance provider service 333a sends the required data from the received NPC package (i.e. set of NPC data including audio/voice NPC digital asset and corresponding identified lines of dialogue corresponding to the NPCs speaking/listening for each NPC, script data and/or directors notes/options and the like) to the selected synthetic facial backend provider component, which accesses the corresponding synthetic facial service that uses the data of the received NPC package to generate and/or synthesize data representative of a facial animation performance for the NPCs performing the identified lines of dialogue, i.e. a synthetic facial digital NPC asset is created, which will be included into the set of NPC data for each NPC and passed to a synthetic performance processor 332g. The user may have indicated in the script which of the synthetic facial backend provider components 334a-334e to use. The user may also have included in the script one or more directors notes with selected directors options such as, for example, facial performance options specific to the selected synthetic facial backend provider component 334a that the user may have chosen for use by the selected synthetic facial backend provider component 334a in generating the desired synthetic NPC facial performance. Alternatively or additionally, if none of the synthetic facial backend provider components 334a-334e have been preselected, the synthetic facial performance provider service 333a may provide a selection of synthetic facial backend provider components 334a-334e to the user to select. A selected synthetic facial backend provider component 334a may provide the user with a drop down menu/combo box of directors notes/directors options specific to the selected synthetic facial backend provider 334a that the user may choose from in relation to generating the desired synthetic NPC facial performance. Alternatively or additionally, the synthetic facial performance provider service 333a may be configured to automatically select the synthetic facial backend provider and required directors options based on the script, lines of dialogue and/or directors notes of the script. The synthetic facial performance provider service 333a requests the selected synthetic facial backend provider component 334a to synthetically generate one or more facial digital NPC assets associated with each of the identified lines of dialogue in the script of the corresponding NPCs speaking/listening and/or the directors notes/options selected in relation to the identified lines of dialogue and the like. The retrieved or synthetically generated facial digital NPC asset that is generated may be passed to the synthetic performance processor 332g.

Similarly, if one or more synthetic body animation digital NPC assets are to be created, the synthetic body performance provider service 333b sends the received NPC package (i.e. the sets of NPC data including audio/voice NPC digital asset and corresponding identified lines of dialogue corresponding to the NPCs speaking/listening for each NPC) to the selected synthetic body backend provider, which uses the received NPC package to generate and/or synthesize data representative of a body animation performance for each of the NPCs performing the identified lines of dialogue, i.e. a synthetic body digital NPC asset for each NPC, which is included into the set of NPC data for each NPC and passed to the synthetic performance processor 332g. The user may have indicated in the script which of the synthetic body backend provider components 336a-336e to use. The user may also have included in the script one or more directors notes with selected directors options such as, for example, body performance options specific to the selected synthetic body backend provider component 336a that the user may have chosen for use by the selected synthetic body backend provider 336a in generating the desired synthetic NPC body performance. Alternatively or additionally, if none of the synthetic body backend provider components 336a-336e have been preselected, the synthetic body performance provider service 333b may provide a selection of synthetic body backend provider components 336a-336e to the user to select. A selected synthetic body backend provider component 336a may provide the user with a drop down menu/combo box of directors notes/directors options specific to the selected synthetic body backend provider 336a that the user may choose from in relation to generating the desired synthetic NPC body performance. Alternatively or additionally, the synthetic body performance provider service 333b may be configured to automatically select the synthetic body backend provider and required directors options based on the script, lines of dialogue and/or directors notes of the script. The synthetic body performance provider service 333b requests the selected synthetic body backend provider component 336a to synthetically generate one or more body digital NPC assets associated with each of the identified lines of dialogue in the script of the corresponding NPCs speaking/listening and/or the directors notes/options selected in relation to the identified lines of dialogue and the like. The retrieved or synthetically generated body digital NPC asset that is generated may be passed to the synthetic performance processor 332g.

The synthetic performance processor 332g may receive the set of NPC data including the synthetic facial digital NPC assets and/or synthetic body digital NPC assets corresponding to the identified lines of dialogue corresponding to the NPCs speaking/listening for each NPC. Alternatively, the synthetic performance processor 332g may receive one or the other of the synthetic facial digital assets or synthetic body digital assets from the selected facial or body backend provider, respectively, and have received a stored body digital assets or facial digital assets, respectively. In any event, the synthetic performance processor 332g combines or applies the received set of NPC data including the facial digital NPC assets and body digital NPC assets of each NPC in relation to the identified line of dialogue corresponding to the NPCs speaking/listening to an NPC rig/model for creating data representative of an NPC asset for each NPC embodying the performance of the NPCs in relation to the identified lines of dialogue. The NPC rig/model may be specified in the script and/or selected by the user. The synthetic performance processor 332g passes data representative of each NPC assets and/or sets of NPC data including corresponding body/facial digital NPC assets to NPC animation input/output service 332a, which adds these to the data of the received NPC asset data package, forming an updated NPC asset data package. The NPC animation input/output service 332a sends the updated NPC asset data package to the cinematography component 340 of FIG. 3e.

Figure 3E:
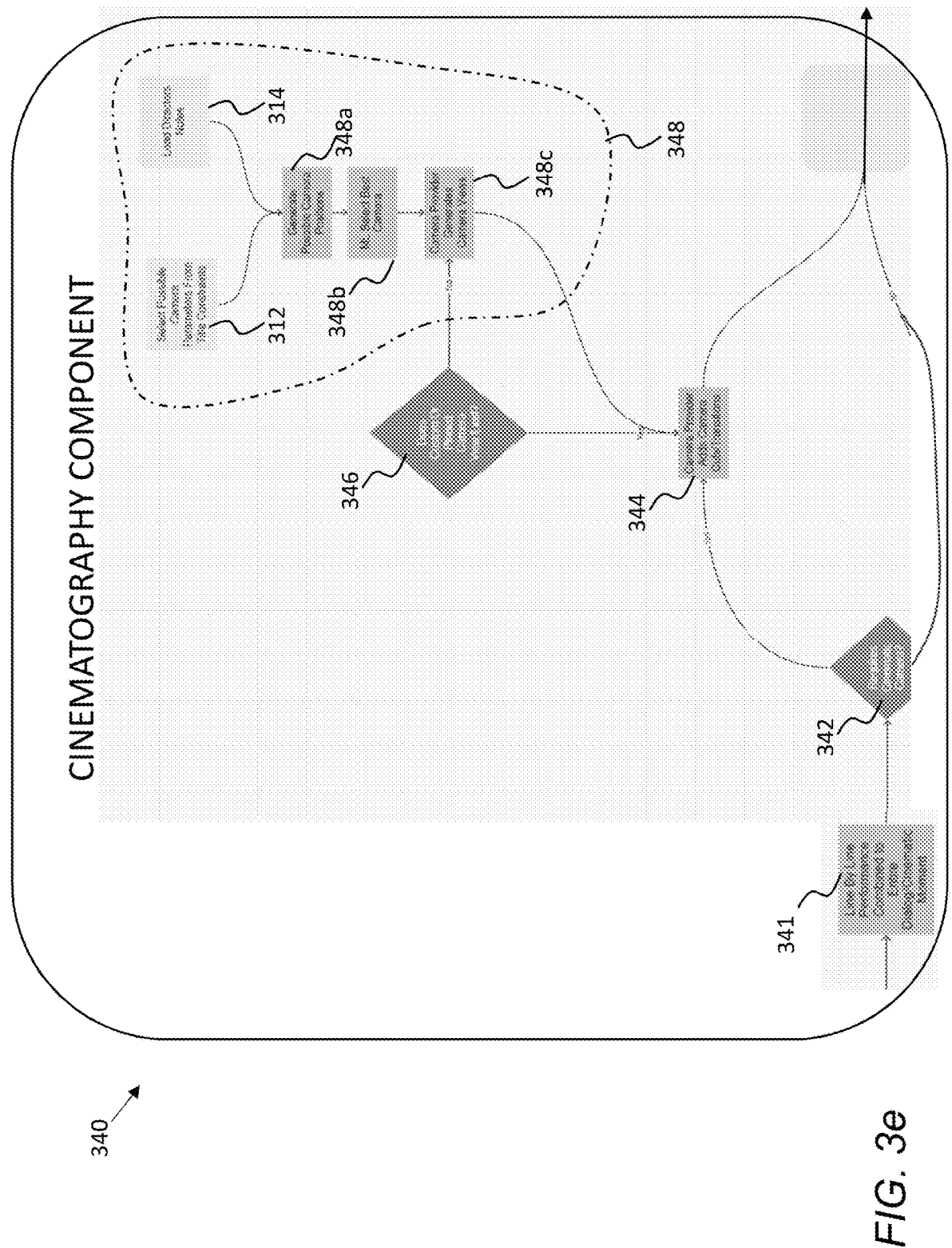
FIG. 3e illustrates an example cinematography component for use in game development pipeline systems of FIG. 1a, 1b and/or 2 according to some embodiments of the invention.

FIG. 3e illustrates an example cinematography component 340 for use in game development pipeline systems 104a, 110, 200 and/or processes 130, 150, 170 with respect to FIGS. 1a-1e and/or 2, combinations thereof, modifications thereto and/or as herein described. Finally, once the game development pipeline system 200 has iterated the entire dialogue of a script, the computer environment world camera constraints are loaded, and passed to the camera provider 344, which along with the director's notes, attempts to generate the ideal camera framing for the shot on a line by line basis.

For example, the cinematography component 340 receives the NPC asset data package from the NPC animation input/output service 332a. The NPC asset data package including data representative of each of the NPC assets and/or sets of NPC data of the corresponding body/facial digital NPC assets. Each script is processed on a line-by-line basis by the game development pipeline system 200 so the cinematography component 340 may receive multiple NPC asset data packages corresponding to each of a plurality of lines of dialogue that make up the script. Once all of these NPC asset data packages have been received, a cinematic processing component 341 may process the line-by-line performance of each NPC in the script combining the NPC assets of each NPC associated with one or more lines of dialogue in the script to form an entire cinematic sequence of the script that may be used by game development component 350 to generate and form an interactive NPC scene. Given that there may be an NPC asset corresponding to each NPC performing each line of the dialogue in the script, the cinematic processing component 341 may process, without limitation, for example animation motion curves of the NPC assets of each NPC to ensure the animation of an NPC asset of the NPC for a line of dialogue of the script smoothly transitions to the next NPC asset of the NPC for the next line of the dialogue of the script involving the NPC. This is performed for all NPCs to form data representative of a cinematic sequence of the interactive NPC scene in relation to the script.

The cinematography component 340 may perform a camera check 342 to determine whether a cinematic camera is required, if no cinematic camera is required, then the data of the received NPC asset data package is further updated to include data representative of the corresponding cinematic sequence, where the updated NPC asset data package is sent to the game development component 350. However, if a cinematic camera is required, then a camera provider component 344 is configured to add camera locations and/or camera framing of virtual cameras in relation to a region of the computer environment that will include the interactive NPC scene, and/or cuts/transitions in relation to the cinematic sequence.

The camera provider component 344 may query the game AMS 109, which includes source control/versioning software (e.g. Perforce (RTM)), to perform a "pinned" and/or finalised camera framing/virtual camera location check 346 in relation to determine whether any stored, "pinned" and/or finalised camera framing/virtual camera locations in the computer environment exist corresponding to the script. If there are stored "pinned" or finalised set of virtual camera locations associated with the script stored in game AMS 109, then the camera provider component 344 outputs the stored, "pinned"/finalised camera framing/virtual camera locations for inclusion into the received NPC asset data package. If there are no stored "pinned" or finalised set of virtual camera locations associated with the script, then a camera solver component 348 may be applied to determine a set of virtual camera locations, camera framing and the like.

The camera solver component 348 is also responsible for generating camera angles dynamically for each line of the script. It accepts the director's notes/options 314, the lines, speaker/listener positions or positions of NPC assets, and, if any, the camera constraints definitions 312 for each scene/line of the script. The camera solver component 348 may select one or more backend camera solving components 348a or 348b, e.g. either ML Inference, or static predefined cameras for each individual scene. Each of the backend camera solving components 348a or 348b may use the camera constraint rules 312, along with director's notes/options 314 to select the best pre-defined camera or generate initial camera views and cuts for the dialogue of the script, if the dialogue calls for it.

For example, the camera solver 348 may receive from the received NPC asset data package data representative of any camera parameters from title constraints 312, director's notes/options 314 in relation to the script. These may be used by one or more backend camera solving component 348a or 348b (e.g. ML models, heuristic algorithms, and/or combinations thereof) to generate a set of candidate virtual camera positions/locations in relation to the region of the computer environment associated with the interactive NPC scene. A ML algorithm and/or heuristic algorithm may be used to select the optimal camera framing and/or virtual camera locations, which may be used by camera provider generator 348c to generate camera views/framing based on the virtual camera locations and the like. The camera solver component 348 may also use recommended camera positions or predetermined camera locations, or camera positions set by the user editing the interactive NPC scene. The data representative of the selected camera framing and/or virtual camera locations, and/or generated camera views are provided to the camera provider component 344 for outputting the generated/selected camera framing/virtual camera locations and/or generated camera views for inclusion, in addition to the cinematic sequence data, into the received NPC asset data package, which also includes the script, the set of NPC data and NPC assets and the like. The cinematography component 340 sends the resulting NPC data package to the game development component 350.

Figure 3F:
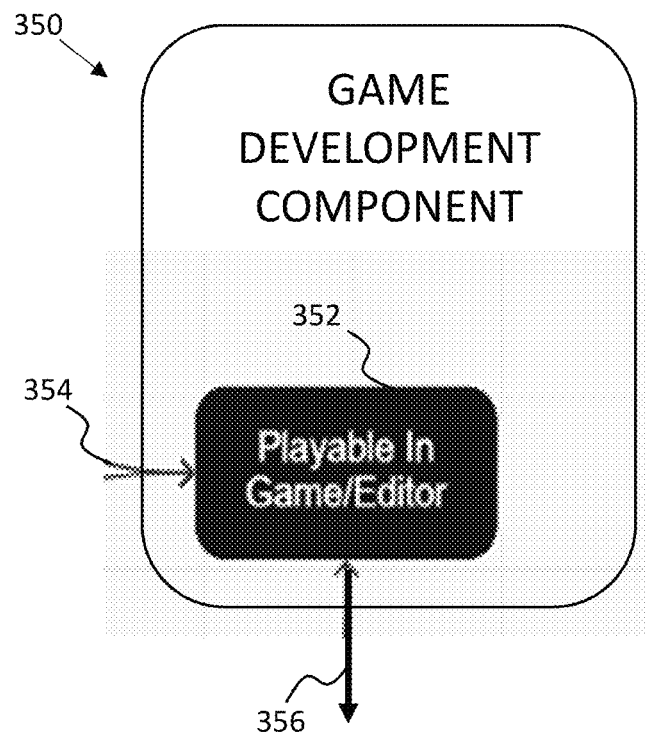
FIG. 3f illustrates an example game development engine component for use in game development pipeline systems of FIG. 1a, 1b and/or 2 according to some embodiments of the invention.

FIG. 3f illustrates an example game development component 350 for use in game development pipeline systems 104a, 110, 200 and/or processes 130, 150, 170 with respect to FIGS. 1a-1e and/or 2, combinations thereof, modifications thereto and/or as herein described. The game development component 350 may include at least a game development engine 352 (e.g. Frostbite (RTM), or other engine known to those of skill in the art). The game development component 350 may receive from pipeline input 354 the NPC asset data package from the cinematography component 340, which includes data representative of the set of NPC data, NPC assets, script, cinematic sequence, selected camera framing and/or virtual camera locations, and/or generated camera views are provided to the camera provider component 344 for outputting the generated/selected camera framing/virtual camera locations and/or generated camera views. The artifacts associated with the received NPC asset package can be integrated and imported into a target game development engine 352 in its engine format creating the appropriate cinematic representation of the interactive NPC scene in relation to the script. This may be performed for the corresponding NPC data asset packages of the plurality of scripts associated with the entire video game, such that all of the interactive NPC scenes of the entire video game may be built.

The game development engine 352 may also have a game development editor in which the cinematic representation of the interactive NPC scene of the script may be presented to a user of the game development engine/client. The game development editor may enable a user to edit the interactive NPC scene associated with the script, and/or edit the corresponding script, NPC assets/sets of NPC data, NPC asset locations, and/or virtual camera locations and the like. User edits may be used to update the corresponding digital NPC assets, NPC assets, and/or scripts and the like stored in game AMS 109 (e.g. using Perforce (RTM) and/or other asset management/control/versioning system known to those of skill in the art) for later retrieval/updates and the like. The game development engine 352 may then send an indication of the changes or user edits via change detection output 356 to the detection component 300 or 202 of the game development pipeline system 200 and the like. This may be used for another iteration of the script and update to the interactive NPC scene in response to the user edits/updates and the like via the game development pipeline system 200. The game development engine editor may present each of the interactive NPC scenes to the user. The game development engine editor is useful to enable a user to quickly iterate edits and see direct results on changes in dialogue content, which are propagated through the game development pipeline system 200 for outputting updated artifacts in relation to the interactive NPC scene. The editor may allow for manipulation of NPC assets, scripts, directors notes/options, and the like. The editor should clearly show the speaking characters, timeline of audio, timeline of animation, and annotate camera cuts. The user may scrub the timeline, moving through the cinematic in real time. The user must be able to 'Pin' NPC Assets that were generated by the pipeline. Pinning assets marks them to not be re-generated in the future by the pipeline, preserving the generated NPC asset in, for example, game AMS 109. It will be treated as a custom animation asset until unpinned. Pipeline video game builds can be triggered directly from the editor.

Figure 4:
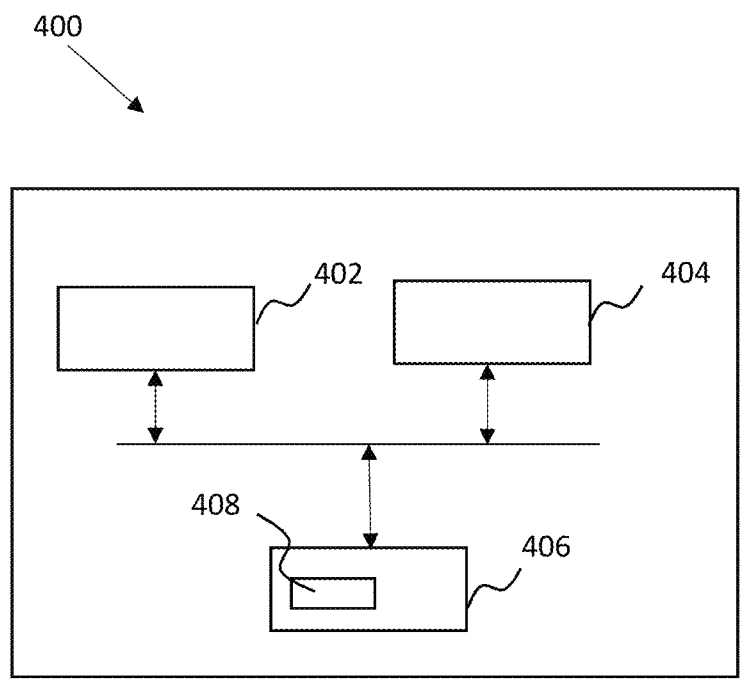
FIG. 4 is a schematic diagram of a computing system according to some embodiments of the invention.

FIG. 4 illustrates a schematic example of a computing system/apparatus for performing any of the methods described herein. The computing system/apparatus shown is an example of a computing device. It will be appreciated by the skilled person that other types of computing devices/systems may alternatively be used to implement the methods described herein, such as a distributed computing system.

The apparatus (or system) 400 comprises one or more processors 402 (e.g. CPUs). The one or more processors 402 control operation of other components of the system/apparatus 400. The one or more processors 402 may, for example, comprise a general-purpose processor. The one or more processors 402 may be a single core device or a multiple core device. The one or more processors 402 may comprise a Central Processing Unit (CPU) or a graphical processing unit (GPU). Alternatively, the one or more processors 402 may comprise specialized processing hardware, for instance a RISC processor or programmable hardware with embedded firmware. Multiple processors may be included.

The system/apparatus comprises a working or volatile memory 404. The one or more processors may access the volatile memory 404 in order to process data and may control the storage of data in memory. The volatile memory 404 may comprise RAM of any type, for example, Static RAM (SRAM), Dynamic RAM (DRAM), or it may comprise Flash memory, such as an SD-Card.

The system/apparatus comprises a non-volatile memory 406. The non-volatile memory 406 stores a set of operation instructions 408 for controlling the operation of the processors 402 in the form of computer readable instructions. The non-volatile memory 406 may be a memory of any kind such as a Read Only Memory (ROM), a Flash memory or a magnetic drive memory.

The one or more processors 402 are configured to execute operating instructions 408 to cause the system/apparatus to perform any of the methods or processes described herein. The operating instructions 408 may comprise code (i.e. drivers) relating to the hardware components of the system/apparatus 400, as well as code relating to the basic operation of the system/apparatus 400. Generally speaking, the one or more processors 402 execute one or more instructions of the operating instructions 408, which are stored permanently or semi-permanently in the non-volatile memory 406, using the volatile memory 404 to store temporarily data generated during execution of said operating instructions 408.

Implementations of the methods or processes described herein may be realized as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 4, cause the computer to perform one or more of the methods described herein.

Any system feature as described herein may also be provided as a method or process feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims and their equivalents.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer-implemented method of generating an interactive non-player character (NPC) scene for a computer game environment of a video game, the method comprising:
    detecting changes in relation to a script associated with the interactive NPC scene;
    generating, for each NPC, a set of NPC data associated with the interactions said each NPC has within the script corresponding to the changes;
    processing the generated set of NPC data with an NPC rig associated with said each NPC to generate an NPC asset;
    applying a camera solver to a region of the computer game environment associated with the script for determining locations of NPC assets and one or more cameras within said region in relation to said interactive NPC scene; and
    outputting data representative of said each NPC asset and said determined NPC asset and camera locations for use by a game development engine for generating said interactive NPC scene.

2. The computer-implemented method of claim 1, wherein detecting changes further comprising:
    receiving data representative of a script in relation to one or more NPC interactions within the computer game environment; and
    processing, for each NPC, the script to identify the interactions said each NPC has within the script for generating the set of NPC data.

3. The computer-implemented method of claim 2, wherein generating, for each NPC, the set of NPC data further comprising retrieving, from an asset management system, data representative of digital assets corresponding to the identified interactions of said each NPC associated with the script for inclusion into the corresponding set of NPC data.

4. The computer-implemented method of claim 2, wherein generating, for each NPC, the set of NPC data further comprising: requesting one or more backend providers to synthetically generate digital assets corresponding to the identified interactions of said each NPC associated with the script for inclusion into the corresponding set of NPC data.

5. The computer-implemented method of claim 1, further comprising storing each of said generated sets of NPC data and/or NPC assets in an asset management system for future update or retrieval.

6. The computer-implemented method of claim 1, further comprising generating a mapping linking each of the sets of NPC data and/or NPC assets with corresponding interactive portions of the script in relation to the interactive NPC scene for storing said mapping in the asset management system.

7. The computer-implemented method of claim 3, wherein the asset management system is configured for retrieving a digital asset corresponding to each identified interaction of said each NPC associated with the script based on:

performing a search, in the asset management system, for one or more relevant digital assets corresponding to said each identified interaction of said each NPC associated with the script;

in response to a positive search result, performing the steps of:
selecting a digital asset from the one or more relevant digital assets based on the priority of said each relevant digital asset; and
retrieving, from the asset management system, the selected digital asset for inclusion into the set of NPC data associated with said each NPC;

in response to a negative search result, performing the steps of:
sending a request to a backend provider associated with the type of digital asset corresponding to each identified interaction of said each NPC associated with the script, wherein the backend provider is configured to generate a digital asset corresponding to said each identified interaction of said each NPC associated with the script; and
retrieving said generated digital asset for inclusion into the set of NPC data.

8. The computer-implemented method of claim 1, wherein the set of NPC data associated with interactions of an NPC further comprising data representative of at least one of:
a vocal digital NPC asset;
a facial digital NPC asset; and
a body digital NPC asset.

9. The computer-implemented method of claim 8, wherein:
the vocal digital NPC asset comprising one or more of:
a voice recording of a person in relation to a portion of the script; and
a synthetically generated voice in relation to a portion of the script;
the facial digital NPC asset comprising one or more of:
a facial motion capture recording of a person in relation to performing a portion of the script; and
a synthetically generated facial animation in relation to a portion of the script; and
the body digital NPC asset comprising one or more of:
a body motion capture recording of a person in relation to performing a portion of the script; and
a synthetically generated body animation in relation to a portion of the script.

10. The computer-implemented method of claim 1, wherein the camera solver is configured for processing the region of the computer game environment associated with the script in relation to the interactions of said NPCs, said processing configured to determine a location for said each NPC asset within the region and an unobstructed camera framing for capturing the interactions of said each NPC asset within said region.

11. The computer-implemented method of claim 1, wherein generating the interactive NPC scene further comprising generating said interactive NPC scene of said each NPC interacting within said region based on positioning the corresponding NPC assets in the determined locations within said region and using one or more virtual cameras in relation to said determined unobstructed camera framing for capturing the interactions of the NPC assets.

12. The computer-implemented method of claim 1, wherein detecting changes in relation to a script associated with the interactive NPC scene further comprising detecting changes to one or more from the group of:

the script associated with the interactive NPC scene;
one or more lines of dialogue in the script associated with the interactive NPC scene;
one or more additional lines of dialogue added to the script;
one or more digital assets of the set of NPC data used for generating an NPC asset associated with the interactive NPC scene;
one or more of the determined camera locations; and
one or more other changes associated with the interactive NPC scene.

13. The computer-implemented method of claim 1, wherein detecting changes in relation to a script associated with the interactive NPC scene further comprising receiving changes from the game development engine corresponding to user edits associated with the interactive NPC scene.

14. The computer-implemented method of claim 1, wherein detecting changes in relation to a script associated with the interactive NPC scene further comprising receiving version change information associated with user edits of an NPC asset associated with the interactive NPC scene, the user edits comprising edits of one or more digital assets of the set of NPC data used for generating the NPC asset.

15. The computer-implemented method of claim 1, wherein the script comprises data representative of one or more from the group of:
one or more lines of dialogue associated with the one or more NPCs in the interactive NPC scene;
directors notes or options associated with the script;
NPC rig associated with the one or more NPCs in the interactive NPC scene;
NPC model associated with the one or more NPCs in the interactive NPC scene; and
any other data associated with the one or more NPC performances within the interactive NPC scene.

16. The computer-implemented method of claim 1, further comprising iteratively performing the method of generating an interactive NPC scene based on any changes and/or updates to at least one of: the interactive NPC scene; corresponding NPC assets associated with the interactive NPC scene; corresponding one or more digital assets of the set of NPC data for generating an NPC asset associated with the interactive NPC scene.

17. A pipeline system for generating an interactive non-player character (NPC) scene for a computer game environment of a video game, the system comprising at least one processor, a memory and a communication interface, the memory comprising instructions that, when executed by the at least one processor, cause the system to perform operations comprising:
detecting changes in relation to a script associated with an interactive NPC scene;
generating, for each NPC, a set of NPC data associated with the interactions said each NPC has within the script corresponding to the changes;
processing the generated set of NPC data with an NPC rig associated with said each NPC to generate an NPC asset;
applying a camera solver to a region of the computer game environment associated with the script for determining locations of the generated NPC assets and one or more cameras within said region in relation to said interactive NPC scene; and
outputting data representative of said each generated NPC asset and said determined NPC asset and camera locations for use by a game development engine in generating the interactive NPC scene.

18. The pipeline system of claim 17, wherein the at least one processor is configured for outputting the data representative of said each generated NPC asset and said determined NPC asset and camera locations to a game building system configured for generating said interactive scene and building the video game with the said generated scene therein.

19. The pipeline system of claim 18, wherein the game building system is further configured for building the video game with NPCs in the computer game environment, the game building system comprising at least one processor, a memory unit and a communication interface, the game building system further comprising:
- a plurality of client apparatus configured for generating a plurality of corresponding interactive NPC scenes for inclusion into the video game, each interactive NPC scene based on data representative of a script in relation to NPCs interactions within the computer game environment, each script is processed to identify, extract and store one or more digital assets as a set of NPC data associated with each NPC for generating NPC assets for a corresponding interactive NPC scene;
- a plurality of backend apparatus configured for generating digital assets associated with one or more interactions each NPC has within an interactive NPC scene of a script for inclusion into the set of NPC data for said each NPC; wherein the at least one processor of the game building system is configured to:
  - detect changes in at least one of:
    - one or more of the plurality of interactive NPC scenes;
    - one or more scripts corresponding to said interactive NPC scenes; or
    - one or more digital assets of the sets of NPC data used to generate NPC assets associated with said interactive NPC scenes;
  - retrieve, for each detected change, one or more digital assets from storage or said plurality of backend apparatus for updating the corresponding set of NPC data;
  - update NPC assets associated with the changes by applying the updated sets of NPC data to each corresponding NPC asset associated with said each NPC interactive scene;
  - apply a camera solver to each region of the computer game environment associated with each script for determining locations of the corresponding updated NPC assets and one or more cameras within said region in relation to said interactive NPC scenes; and
  - generate, using a game development engine, each of the plurality of interactive NPC scenes based on the corresponding region and determined locations of the corresponding NPC assets and the one or more cameras; and
  - build the video game based on data representative of the plurality of interactive NPC scenes.

20. A non-transitory tangible computer-readable medium comprising data or instruction code generating an interactive non-player character, NPC, scene for a computer game environment of a video game, which when executed on one or more processor(s), causes at least one of the one or more processor(s) to perform the steps of the method of:
- detecting changes in relation to a script associated with an interactive NPC scene;
- generating, for each NPC, a set of NPC data associated with the interactions said each NPC has within the script corresponding to the changes;
- processing the generated set of NPC data with an NPC rig associated with said each NPC to generate an NPC asset;
- applying a camera solver to a region of the computer game environment associated with the script for determining locations of NPC assets and one or more cameras within said region in relation to said interactive NPC scene; and
- outputting data representative of said each NPC assets and said determined NPC asset and camera locations for use in generating the interactive NPC scene.

\* \* \* \* \*

UNITED STATES PATENT AND TRADEMARK OFFICE
CERTIFICATE OF CORRECTION

PATENT NO. : 11,738,266 B1
APPLICATION NO. : 17/701060
DATED : March 22, 2022
INVENTOR(S) : Eric Braun et al.

It is certified that error appears in the above-identified patent and that said Letters Patent is hereby corrected as shown below:

In the Specification

In Column 7, Line 48, delete "no" and insert -- 110 --, therefor.

In Column 7, Line 54, delete "no" and insert -- 110 --, therefor.

In Column 7, Line 62, delete "iota," and insert -- 102a, --, therefor.

In Column 9, Line 37, delete "iota" and insert -- 102a --, therefor.

In Column 11, Line 53, delete "iota" and insert -- 102a --, therefor.

In Column 11, Line 59, delete "no" and insert -- 110 --, therefor.

In Column 12, Line 8, delete "no" and insert -- 110 --, therefor.

In Column 12, Line 15, delete "no" and insert -- 110 --, therefor.

In Column 12, Line 29, delete "no" and insert -- 110 --, therefor.

In Column 12, Line 36, delete "no" and insert -- 110 --, therefor.

In Column 12, Line 44, delete "iota" and insert -- 102a --, therefor.

In Column 12, Line 60, delete "iota" and insert -- 102a --, therefor.

In Column 13, Line 29, delete "iota" and insert -- 102a --, therefor.

In Column 13, Line 32, delete "iota" and insert -- 102a --, therefor.

Signed and Sealed this
Second Day of January, 2024

Katherine Kelly Vidal
*Director of the United States Patent and Trademark Office*

CERTIFICATE OF CORRECTION (continued)
U.S. Pat. No. 11,738,266 B1

In Column 13, Line 34, delete "iota" and insert -- 102a --, therefor.

In Column 13, Line 44, delete "no" and insert -- 110 --, therefor.

In Column 14, Line 12, delete "no" and insert -- 110 --, therefor.

In Column 14, Line 24, delete "no" and insert -- 110 --, therefor.

In Column 14, Line 57, delete "no" and insert -- 110 --, therefor.

In Column 14, Line 62, delete "no" and insert -- 110 --, therefor.

In Column 14, Line 66, delete "no" and insert -- 110 --, therefor.

In Column 15, Line 4, delete "no" and insert -- 110 --, therefor.

In Column 15, Line 10, delete "no" and insert -- 110 --, therefor.

In Column 15, Line 13, delete "no" and insert -- 110 --, therefor.

In Column 15, Line 20, delete "no" and insert -- 110 --, therefor.

In Column 15, Line 27, delete "no" and insert -- 110 --, therefor.

In Column 15, Line 53, delete "no," and insert -- 110, --, therefor.

In Column 15, Line 58, delete "no" and insert -- 110 --, therefor.

In Column 17, Line 32, delete "no" and insert -- 110 --, therefor.

In Column 18, Line 61, delete "iso," and insert -- 150, --, therefor.

In Column 20, Line 50, delete "iota." and insert -- 102a. --, therefor.

In Column 20, Line 51, delete "iota" and insert -- 102a --, therefor.

In Column 21, Line 35, delete "no." and insert -- 110. --, therefor.

In Column 21, Line 45, delete "no" and insert -- 110 --, therefor.

In Column 22, Line 24, delete "iota" and insert -- 102a --, therefor.

In Column 22, Line 27, delete "iota" and insert -- 102a --, therefor.

CERTIFICATE OF CORRECTION (continued)
U.S. Pat. No. 11,738,266 B1

In Column 25, Line 53, delete "ma," and insert -- 110a, --, therefor.

In Column 37, Line 41, delete "iota" and insert -- 102a --, therefor.